(12) United States Patent
Sinivaara et al.

(10) Patent No.: US 9,990,455 B1
(45) Date of Patent: Jun. 5, 2018

(54) ARRANGEMENT AND METHOD FOR FACILITATING ELECTRONICS DESIGN IN CONNECTION WITH 3D STRUCTURES

(71) Applicant: TactoTek Oy, Oulunsalo (FI)

(72) Inventors: Hasse Sinivaara, Oulunsalo (FI);
Tuomas Heikkilä, Oulunsalo (FI);
Antti Keränen, Oulunsalo (FI)

(73) Assignee: TACTOTEK OY, Oulunsalo (FI)

( * ) Notice: Subject to any disclaimer, the term of this patent is extended or adjusted under 35 U.S.C. 154(b) by 0 days. days.

(21) Appl. No.: 15/840,549

(22) Filed: Dec. 13, 2017

(51) Int. Cl.
*G06F 17/50* (2006.01)
*G05B 19/4099* (2006.01)

(52) U.S. Cl.
CPC ...... *G06F 17/5072* (2013.01); *G06F 17/5018* (2013.01); *G06F 17/5081* (2013.01); *G05B 19/4099* (2013.01); *G05B 2219/45031* (2013.01); *G06F 2217/02* (2013.01); *G06F 2217/04* (2013.01); *G06F 2217/06* (2013.01); *G06F 2217/12* (2013.01)

(58) Field of Classification Search
CPC ............. G06F 17/5045; G06F 17/5068; G06F 17/5072; G06F 17/5081; G06F 2217/02; G06F 2217/12

USPC ......................................................... 716/119
See application file for complete search history.

(56) References Cited

U.S. PATENT DOCUMENTS

| | | | |
|---|---|---|---|
| 2015/0145177 A1* | 5/2015 | Ei-Siblani ............. | B29C 67/007 264/497 |
| 2016/0098495 A1* | 4/2016 | Dong ........................ | A61F 2/28 219/76.12 |

* cited by examiner

*Primary Examiner* — Paul Dinh
(74) *Attorney, Agent, or Firm* — Robert P. Michal, Esq.; Carter, DeLuca, Farrell & Schmidt, LLP

(57) ABSTRACT

An electronic arrangement for facilitating circuit layout design in connection with three-dimensional (3D) target designs, the arrangement including at least one communication interface for transferring data, at least one processor for processing instructions and other data, and a memory for storing the instructions and other data. The at least one processor being configured, in accordance with the stored instructions, to cause: obtaining and storing information in a data repository hosted by the memory, receiving design input characterizing 3D target design to be produced from a substrate, determining a mapping between locations of the 3D target design and the substrate, and establishing and providing digital output comprising human and/or machine readable instructions indicative of the mapping to a receiving entity, such as a manufacturing equipment, e.g. printing, electronics assembly and/or forming equipment.

27 Claims, 8 Drawing Sheets

ARRANGEMENT AND METHOD FOR FACILITATING ELECTRONICS DESIGN IN CONNECTION WITH 3D STRUCTURES

The project leading to this application has received funding from the European Union's Horizon 2020 research and innovation programme under grant agreement No 725076.

FIELD OF THE INVENTION

Generally the present invention relates to electronics, associated devices, structures and methods of manufacture. In particular, however not exclusively, the present invention concerns e.g. computer-aided design and subsequent manufacturing of electrical circuits in connection with 3D structures established from initially substantially flat elements.

BACKGROUND

Generally there exists a variety of different stacked assemblies and structures in the context of electronics and electronic products.

The motivation behind the integration of electronics and related products may be as diverse as the related use contexts. Relatively often size savings, weight savings, material savings, cost savings, performance gain or just efficient cramming of components is sought for when the resulting solution ultimately reduces into a multilayer structure carrying electronics and exhibiting a desired shape. The associated use scenarios may be various and numerous, relating to e.g. product packages or food casings, visual design of device housings, wearable electronics, personal electronic devices, displays, detectors or sensors, vehicle interiors, antennae, labels, vehicle electronics, furniture, etc.

Electronics such as electronic components, ICs (integrated circuit), and conductors, may be generally provided onto a substrate element by a plurality of different techniques. For example, ready-made electronics such as various surface mount devices (SMD) may be mounted on a substrate surface that ultimately forms an inner or outer interface layer of a multilayer structure. Additionally, technologies falling under the term "printed electronics" may be applied to actually produce electronics directly and essentially additively to the associated substrate. The term "printed" refers in this context to various printing techniques capable of producing electronics/electrical elements from the printed matter, including but not limited to screen printing, flexography, and inkjet printing, through a substantially additive printing process. The used substrates may be flexible and printed materials organic, which is however, not always the case.

CAE (computer-aided design) generally refers to usage of computer software tools for engineering tasks. CAD (computer-aided design) and ECAD (electrical/electronic computer-aided design, or EDA electronic design automation), in turn, refer to usage of computers for overall design and specifically electronic system design, respectively.

Majority of contemporary computer-run tools for designing circuit layouts strongly rely upon planar, single layer or stacked, substrates such as ordinary glass epoxy based FR4 (flame retardant) type PCBs (printed circuit board) or flexible PCBs for hosting an electronics layer such as conductor traces and components, which induces many kinds of challenges in modern electrical and electronic design tasks due to a fact that while the integration level of electronics is on the rise as contemplated hereinbefore, more efficient integration cannot in the end solely rely upon simple planar shapes or specifically planar substrates, or single layer electronics, when the end products themselves are of various imaginative form and size.

The concept of injection molded structural electronics (IMSE) involves building functional devices and parts therefor, which encapsulate electronic functionality as seamlessly as possible. Characteristic to IMSE is also that the electronics is commonly manufactured into a true 3D (non-planar) form in accordance with the 3D models of the overall target product, part or generally design.

To achieve desired 3D layout of electronics on an 3D substrate and in the associated end product, the electronics may be still provided on an initially planar substrate, such as a film, using two-dimensional (2D) methods of electronics assembly, whereupon the substrate, already accommodating the electronics, may be formed into a desired three-dimensional, i.e. 3D, shape and subjected to overmolding, for example, by suitable plastic material that covers and embeds the underlying elements such as electronics, thus protecting and potentially hiding the underlying elements from the environment.

In the afore-explained context, traditional type of circuit layout design is particularly demanding as it is still essentially done in 2D domain using ordinary 2D ECAD tools while a designer has to keep in mind that the final product shape is substantially non-planar and may exhibit e.g. bent areas with modest or considerable curvature, different types of edges, cuts, etc. When an initially planar substrate is subjected to forming such as thermoforming, it, besides changing in shape, also locally deforms, basically elongates, through stretching together with an increase of a so-called draw ratio of the substrate, referring to the ratio of a surface area and footprint thereof.

One challenge arises from the correct positioning of circuit elements on the initial 2D surface from the standpoint of their intended target position in the formed 3D product. The target position of the circuitry in the 3D product may be based on different aesthetic and/or functional objectives associated with the circuitry, for example.

In addition, as the electrical properties of electronics and materials used therein, with reference to e.g. conductive traces and electronic components of potentially printed or mounted type, may change even radically when subjected to physical shear stress during and following a forming phase, it may easily appear that an originally electrically fully functional circuit design developed and perhaps simulated or tested using a 2D model or a 2D substrate, respectively, works sub-optimally or even fails miserably after 3D forming of a 2D preform carrying such design. It is indeed difficult to duly deduce upfront proper configuration of a variety of desired circuit features on a planar substrate having regard to both materials and locations thereof to ascertain their correct electrical operation also after 3D forming of the substrate, even if the positioning of at least portion of the circuit features in the final 3D shape is not originally, as such, an issue or in the particular interest of the designer.

Yet, various mountable ready-made electronics including e.g. dedicated components and integrated circuits (IC) may not withstand the necessary 3D-forming of the underlying substrate if positioned in locations subjected to high stress, with reference to e.g. ceramic or plastic packages thereof not forgetting the actual electrical or electronic features, and will break or at least detach from the substrate as a result.

SUMMARY

The objective of the present invention is to at least alleviate one or more of the above drawbacks associated with the existing solutions e.g. in the context of process and feature design, such as circuit layout design, for three-dimensional objects.

The objective is achieved with various embodiments of an electronic arrangement and a related method to be executed by the arrangement in accordance with the present invention.

According to one embodiment of the present invention, an electronic arrangement for facilitating circuit layout design in connection with three-dimensional (3D) target designs, optionally comprising one or more servers, comprises at least one communication interface for transferring data, at least one processor for processing instructions and other data, and memory for storing the instructions and other data, said at least one processor being configured, in accordance with the stored instructions, to cause:

obtaining and storing information in a data repository hosted by the memory, characterizing materials and/or processes applicable in producing circuits of electrically conductive structures on electrically insulating substrates subjected to processing such as 3D forming, receiving design input characterizing
   3D target design, preferably at least 3D surface and/or solid target design (i.e. 3D target structure, optionally via a mechanical CAD model), to be produced from a substrate, said substrate optionally comprising an initially substantially planar thermoplastic film,
   target circuit design, defined in 2D and/or 3D domain, to be provided on the substrate, such as components and/or connecting traces in terms of their properties (material, conductivity), dimensions, connections and/or location,
substrate, such material and thickness thereof, optionally represented via a digital model and/or a number of related parameters, and preferably also
   3D forming process, such as type of forming process (e.g. thermoforming, vacuum or low pressure forming), temperature, and/or pressure,
determining a mapping between locations of the 3D target design and substrate, including location of the circuit design, through utilization of a selected mapping technique applying the received design input and information corresponding to the received design input in the data repository, wherein the mapping technique is further configured to take elongation of the substrate during producing the 3D target design therefrom into account in the mapping, and
establishing and providing digital output, such as at least one computer-readable file, comprising human and/or machine readable instructions indicative of the mapping, to a receiving entity, such as a manufacturing equipment, e.g. printing, electronics assembly and/or forming equipment.

According to one other embodiment, an electronic arrangement for facilitating circuit layout design in connection with 3D target designs comprises at least one communication interface for transferring data, at least one processor for processing instructions and other data, and memory for storing the instructions and other data, said at least one processor being configured, in accordance with the stored instructions, to cause:

obtaining and storing information in a data repository hosted by the memory, characterizing one or more materials and processes applicable in producing a 3D substrate for electronics through 3D forming, such as thermoforming, vacuum forming, or low pressure forming, receiving design input characterizing at least 3D target design (preferably 3D surface and/or solid target design), optionally via a mechanical 3D CAD model, to be produced through 3D forming of a substrate, determining a mapping between locations of the 3D target design and unformed substrate, through utilization of a selected mapping technique applying the received design input and information in the data repository, wherein the mapping technique is further configured to estimate elongation of the substrate responsive to said 3D forming and take it into account in the mapping, and establishing and providing digital output, such as at least one computer-readable file, comprising human and/or machine readable instructions indicative of the mapping, to a receiving entity, such as a circuit layout design equipment or manufacturing equipment, e.g. printing, electronics assembly and/or forming equipment.

In accordance with an embodiment of a related method to be executed by a one or more at least functionally connected computer devices such as servers and/or personal computers, e.g. the following items may be executed:

obtaining and storing information in a data repository, characterizing materials and processes applicable in producing circuits of electrically conductive structures on electrically insulating substrates subjected to processing, such as 3D forming, receiving design input characterizing
   3D target design (preferably 3D surface and/or solid target design), optionally via a mechanical CAD model, to be produced from a substrate, optionally by a process involving 3D forming,
   target circuit design, defined in 2D and/or 3D domain, to be provided on the substrate,
   substrate, and preferably also
   3D forming process,
determining a mapping between locations of the three-dimensional target design and the substrate preceding said 3D forming, including location of the circuit design, through utilization of a selected mapping technique applying the received design input and information corresponding to the received design input in the data repository, wherein the mapping technique is further configured to estimate elongation of the substrate responsive to said 3D forming and take it into account in the mapping, and
establishing and providing digital output, such as at least one computer-readable file, comprising human and/or machine readable instructions indicative of the mapping, to a receiving entity, such as a manufacturing equipment, e.g. printing, electronics assembly and/or forming equipment.

In a further embodiment, a method for facilitating circuit layout design in connection with 3D target designs, to be executed by one or more computer devices such as servers and/or personal computers, comprises obtaining and storing information in a data repository, characterizing one or more materials and processes applicable in producing a 3D substrate for electronics through forming, such as thermoforming, receiving design input characterizing at least 3D target design (preferably 3D surface and/or solid target design), optionally via a mechanical CAD model, to be produced through 3D forming of a substrate, determining a mapping between locations of the 3D target design and the substrate preceding said 3D forming, through utilization of a selected mapping technique applying the received design input and information in the data repository, wherein the mapping technique is further configured to estimate stretching of the substrate responsive to said 3D forming and take it into account in the mapping, and establishing and providing digital output, such as at least one computer-readable file, comprising human and/or machine readable instructions indicative of the mapping, to a receiving entity, such as circuit layout design equipment or manufacturing equipment, e.g. printing, electronics assembly and/or forming equipment.

As a general remark, various embodiments of the electronic arrangements suggested herein may be flexibly applied to the embodiments of discussed methods mutatis mutandis, and vice versa, as being appreciated by a skilled person. Yet, various embodiments may be flexibly combined by a person skilled in the art to come up with preferred combinations of features generally disclosed in this text.

The utility of the present invention arises from a plurality of issues depending on each particular embodiment thereof. Generally, various design activities involving provision of electronics and optionally further elements, such as electrical insulators, optical elements and/or graphics, on a processable such as formable, potentially substantially flat substrate, such as a thermoplastic film, to be subsequently 3D formed to exhibit desired non-planar shape(s) may be considerably enhanced. As one outcome, both functioning and position (location or generally layout) of e.g. a circuit schematic to be included in the formed 3D structure but which is at least partially arranged onto the substrate already prior to actual forming stage, may be analyzed, studied, optimized and/or verified upfront, prior to actual physical manufacturing thereof. From the standpoint of conductive and/or insulating electrical features to be provided on the substrate, the suggested solution advantageously supports, besides planar (2D) modeling/estimation of electrical properties such as conductivity, conductance, resistivity or resistance, corresponding point-to-point determinations also in 3D domain, i.e. in relation to a 3D structure (3D target design) obtained through 3D forming of the initial substrate, implying elongation of the substrate material and conductive/features at that point thereon. 2D and 3D versions of a populated substrate may thus be mutually assessed, compared and jointly optimized by the preferred embodiments of the present invention. In addition to electrically meaningful, e.g. conductive or insulating, features, also e.g. thermally conductive or insulating features as well as graphics (which may be printable optionally utilizing similar equipment as being feasible in connection with printed electronics) may be evaluated and optimized.

One shall still realize, however, that even prior to the aforesaid forming taking place in the meaning of the present invention, the used substrate "preform" may in some embodiments contain e.g. inherent or pre-prepared 3D shapes such as recesses, dome shapes, or other protrusions, whereupon the substrate does not have to be planar, although it is generally recognized principle herein that a substantially flat initial substrate is typically preferred to facilitate electronics manufacturing and assembly such as printing and mounting activities in contrast to complex 3D substrate shapes requiring also tedious 3D assembly of electronics and other elements in the structure. Nevertheless, in some embodiments wherein e.g. 3D assembly equipment of electronics or other components is readily available, 3D assembly of all or selected components may be well utilized after producing the 3D target shape from the substrate e.g. by 3D forming, such as thermoforming, thereof. Preferably, printed electronics technology such as screen printing or ink jetting is still applied for producing conductive traces and potential other features of the circuit layout upon the substrate prior to forming. In cases where 3D assembly of e.g. electronic components is utilized subsequent to 3D forming of the substrate, stresses potentially caused to pre-installed components due to forming may be eliminated together with a need for related design considerations. The embodiments of the present invention may still be applied to inspect that the intended target locations for 3D assembly of components fulfill the requirements for such use, for instance, in terms of e.g. surface curvature.

In more detail, a digital 3D model indicative of a mechanical structure of a target design to be obtained through processing, such as 3D forming, of the substrate may be analyzed and then unfolded by a mapping procedure so that e.g. deformation induced by elongation of chosen substrate material taking place responsive to forming is taken into account in associating the points or regions of the 2D and 3D presentations of the substrate models mutually together.

Mapping data, such as offset vectoring type information, can be output and utilized e.g. in internal/local design feature offered by the arrangement, or in external 2D ECAD (or other diagram (schematic)/layout) design tool, or other external tool, as a reference, whereupon the circuit layout can be designed as it would be natively performed over the 3D model.

Indeed, in layout design of circuitry and potential further features provided on the substrate prior to 3D processing such as forming, availability of information on the elongation (stretching) of the substrate thanks to e.g. applicable simulation and/or projection methods of the present invention enabling the mapping, yields many beneficial uses. For example, physical configuration of a desired circuit design, such as shape, dimensions, location, and/or material of conductive traces, electrically insulating (e.g. dielectric) features, printed or mounted components, etc. to be hosted by the substrate may be at least partially automatically and/or through computer-human operator, i.e. user, interaction effectively verified and preferably even optimized against a number of different optimization criteria, such as trace lengths, material stretching, curvatures or specifically bend radiuses, vertical deviation from selected base level (e.g. surface of unformed substrate) and/or electrical conductivity/resistance among other possible options. Optimization based on the criteria may then translate into efforts minimizing the related design characteristics such as trace lengths, maximizing them (e.g. electrical conductivity), retaining within limits or reaching selected optimum values.

In view of human-controlled, assisted or monitored design, a human operator such as circuit layout designer may particularly benefit from presenting, by means of e.g. graphical or numeric visualization, substrate areas subject to elongation during forming, and indication of the actual extent of elongation as well. Deformation such as elongation may be illustrated using e.g. numeric (stress factor or percentage) and/or graphical indicators (e.g. contour lines, arrows, colors, fill patterns, shadowing, etc.) shown on a display. The indicators may be superposed over or integrated with a graphical representation of the substrate in its 2D (unformed/unfolded) and/or 3D state (i.e. state representing the target mechanical structure obtained via forming of the substrate). In case the used design tool, which can optionally be integral with the present solution, is capable of visualizing height curve type contour lines and/or the actual 3D model (e.g. via a selected orthographic such as axonometric projection view), related deformation/elongation data and/or further related data such as electrical conductivity/resistance of circuit traces, bend radiuses or generally, curvature information, may be naturally depicted in connection with, or in the case of 2D model instead of, height or other 3D (surface) data; forming of a surface region to deflect the region from its original position, such as a selected base level of the substrate, by a recess or protrusion is achieved by basically stretching the substrate material, whereupon these two phenomena thus tend to go hand-in-hand.

The mapping between locations such as points or larger regions (areas) of the substrate in both 2D and 3D domains obtained utilizing e.g. simulation or map projection (cartographic projection) type estimation may thus be widely exploited in determining applicable configuration of actual circuit layout to be provided on a substrate while it is still planar, in view of original target circuit design, such as schematic or layout, which may have been originally defined in 2D or 3D domain, or using a combination of both without taking the effect of substrate and e.g. conductor material deformation including elongation into account. In a simple example, proper location of circuit elements such as traces or components of an already existing 2D circuit design that has been initially considered to be positioned on the substrate in a certain manner may be verified having regard to a formed 3D product through utilization of the established mapping and related analysis tasks.

In some embodiments, the present invention may be additionally or alternatively utilized for mapping, e.g. circuit layout, optics and/or graphics design, purposes in 2D domain wherein both the initial substrate and the processed, elongated target design obtained therefrom are substantially two-dimensional, or in the case of three-dimensionality, at least the processing has not essentially changed the original, potentially 3D, shape of the initial substrate (i.e. the processing has elongated/stretched the substrate without substantially altering its original shape).

In addition to or instead of optimal circuit layout in terms of its spatial properties and e.g. materials (materials may be selected, besides being conductive or insulating enough, also sufficiently elastic to withstand forming without substantial fractures), in various embodiments of the present invention also the substrate configuration itself may be optimized by preferred embodiments of the present invention based on the mapping in terms of material(s) and e.g. related thickness(es), or generally dimensions, selection.

In some embodiments, also the target 3D design to be established by processing such as forming the substrate may be automatically adapted or the adaptation (actual solution or a need therefor) may at least be suggested to a human operator or computerized recipient. This is advantageously done responsive to design requirements or preferences regarding the substrate and optionally circuit materials and their configuration in cases where it seems, by the conducted, preferably automated, design analysis that the original design cannot be obtained with desired characteristics such as durability or e.g. yield from the standpoint of e.g. active substrate/material constraints. For example, properties such as draw ratio and/or bend radiuses of the planned 3D shapes of the initial target design may be assessed against the available substrate, circuit or other material or design constraints, to determine their real-life feasibility. In the case of a detected problem or risk, adaptation of one or more design parameters, i.e. optimization, may then be executed or suggested by the concerned embodiment to the operator. In the assessment, e.g. data available in the data repository concerning processes such as printing, mounting and/or forming processes, and/or related materials and their characteristics or applicability in different use scenarios, may be utilized to find mismatches between the target 3D design and practically achievable design by the available substrate and/or circuit configurations.

As already alluded to above, in various embodiments of the present invention a number of characteristics regarding electrically conductive features such as traces provided, preferably by means of printed electronics (additive) technology such as screen printing or ink jetting, on the substrate prior to processing such as forming thereof may be further analyzed and optimized either automatically or through dynamic user-interaction in view of electrical resistance (or correspondingly, impedance as being easily appreciated by a skilled person), which will change from the initial (situation prior to forming of the substrate) figures due to elongation of the trace material caused by the aforesaid forming or similar processing. As a basic rule, stretching or elongating a conductor trace will increase its resistance; the same amount of trace material will have to, responsive to elongation, cover a greater area, which may convert into reduced trace thickness, for example. The cross-sectional area of a trace or other conductive feature may reduce and e.g. the structure of conductive material(s) such mutual distance between silver, copper, gold, platinum, carbon or other particles may lengthen responsive to elongation of the feature, which usually translates into reduced conductance/increased resistance of the feature.

Accordingly, the optimization may be based on a number of potentially side by side applied criteria or objectives such as minimum resistance, minimum material use (e.g. minimum length, width, thickness, surface area, cross-sectional area, and/or generally dimensions of traces), and/or minimum value spent, i.e. cost minimization, (which may be also considered as material selection type optimization). The criteria may be targeted to the electrical traces of the circuit in general or to specifically (user-)selected trace(s), depending on the embodiment. As with other parameters, optimization relating to electrical resistance, or correspondingly conductance (i.e. inverse measure indicative of electrical conductivity), may be performed through utilization of data obtained by the mapping procedure, based on e.g. simulation and/or projection methods, as well as data available in the repository regarding, for instance, different materials, their properties and behavior when subjected to forming-induced elongation. The present invention thus brings in completely new aspects to the field of traditional ECAD or related optimization tasks, and various embodiments of the present invention may also at least selectively adopt selected features of the traditional ECAD (e.g. schematic or layout design, component selection, trace design, insulator design, etc.).

Yet, as already briefly mentioned hereinbefore various embodiments of the present invention may be adapted to facilitate analysis and/or provision of electrically insulating features, preferably by means of printed electronics technology, on still unformed substrate by implementing a corresponding modeling feature in an offered design tool. Accordingly, the tool may be configured to optimize or facilitate user-controlled or -assisted optimization of related electrically insulating materials (e.g. dielectrics). For example, an electrically insulating feature such as a layer or pad positioned on top of a (printed) conductive feature, such as a trace or more comprehensive circuit, to be able to position a further conductive feature thereon to establish a functional stack without causing a short circuit between the two conductive features thereof, could be provided and optimized in view of a number of material characteristics such as resistance, volume resistivity, dielectric strength, breakdown voltage, and/or current sustaining properties. Similarly, an insulating feature could be positioned in between conductive features in lateral direction along the surface of the substrate. For example, resistance of resistivity of the insulator could be maximized, or it should at least reach a minimum sufficient value, as examples of applicable design objectives. Also the dimensions and/or shape of the insulating feature, typically also affecting the electrical properties, could be optimized.

By enabling the design and therethrough actual provision of stacked, alternating layers of electrically conductive and insulating materials on a side of a substrate, various useful additive local features such as unconnected crossings of conductive features such as traces, components or greater area—spanning, more complete layers of conductive features such as circuits may be provided, preferably conveniently by printing. Accordingly, space utilization may be made more effective on any side of the substrate. For instance, when desired, more features may be cleverly stacked on one side of the substrate without a necessity to split them between both sides and arranging connecting vias between the sides.

Preferably, the tool provided in accordance with an embodiment of the present invention incorporates a feature, such as layout checking feature, which is configured to properly identify the nature of a crossing of conductive features of the input circuit design, i.e. whether it really is of short-circuit (connected) or unconnected (having insulator in between) type. One practical approach to implement this, which may be further correctly understood by external software exploiting the digital output of the arrangement or method of the embodiment of the present invention, incorporates modeling the insulating features on a par with conductive features, e.g. as components, with a crucial difference in electrical conductivity (particularly low conductance, or respectively, particularly high electrical resistance associated with insulating feature) properties thereof.

Further uses, benefits and advantages of different embodiments of the present invention become apparent on the basis of the detailed description below.

The expression "a number of" may herein refer to any positive integer starting from one (1). The expression "a plurality of" may refer to any positive integer starting from two (2), respectively.

The terms "first" and "second" are herein used to distinguish one element from other element, and not to specially prioritize or order them, if not otherwise explicitly stated.

The terms "resistance" and "impedance" are herein used interchangeably if not otherwise explicitly stated.

The term "communication interface" may refer herein, besides a general concept of shared boundary through which two or more devices such as computers transfer information to each other, to actual communication equipment, such as a transceiver, providing a compatible wired or wireless communication ability to a host device to be able to communicate via the interface. For example, the communication interface may refer to selected LAN or WLAN standard following data transfer circuit. The interface may be thus implemented, from a standpoint of a single participating device, by arranging appropriate hardware and software controlling the hardware (in terms of e.g. related data transfer) at the device, as being easily understood by a person skilled in the art.

Different embodiments of the present invention are disclosed in the attached dependent claims.

BRIEF DESCRIPTION OF THE DRAWINGS

Next the present invention will be described in greater detail with reference to the accompanying drawings, in which.

DETAILED DESCRIPTION

Figure 1A:
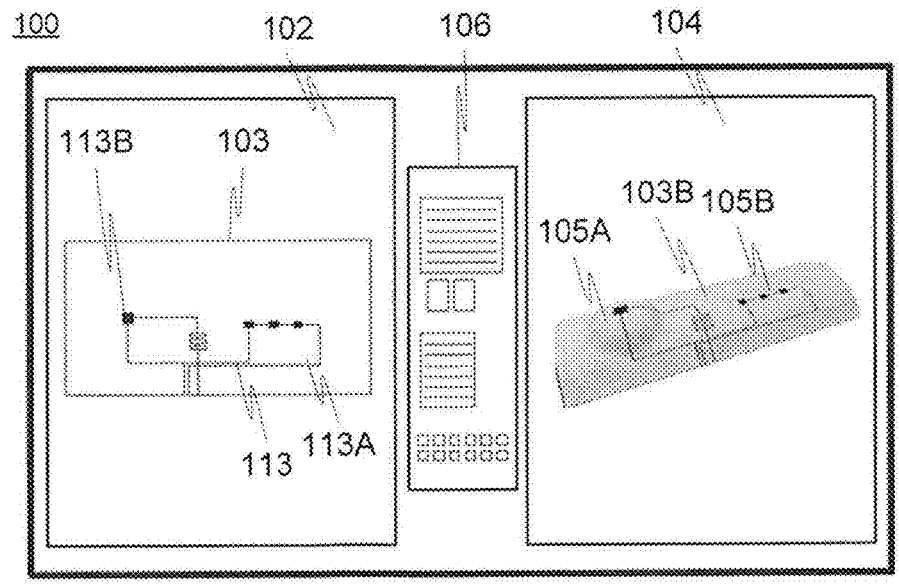
FIG. 1A illustrates various principles of the present invention via a general sketch representing e.g. a number of potential features of a UI in accordance with one embodiment of an electronic arrangement carrying out a respective method.

Various examples of applicable manufacturing processes, devices, components and materials for producing multilayer structures in accordance with IMSE principles are described e.g. in U.S. patent application Ser. Nos. 15/687,095 and 15/687,157, the contents of which are incorporated herein by reference in their entirety.

FIGS. 1A-1D and FIGS. 2-3 generally represent selected features and related concepts of various preferred embodiments of the present invention by certain rather illustrative but still essentially merely exemplary visualizations and sketches, which could, in turn, be flexibly established and indicated to users (operators) by different embodiments of a user interface (UI) offered by the arrangements and methods described and claimed herein.

In more detail, FIG. 1 illustrates various preferred, but not necessarily realized (in every embodiment), features of the present invention via a general sketch 100 coarsely representing a potential UI view in accordance with one embodiment of an electronic arrangement carrying out a respective method. The arrangement may comprise at least one computer device, such as a personal computer and/or a server, running a computer program in accordance with the present invention for executing computational operations, such as mapping between the locations of original (e.g. substantially flat/2D) substrate and 3D formed version thereof, and preferably providing a visual UI via a local or remote digital display such as an LCD, LED or OLED display, for example, which may optionally be touch sensitive.

The overall view 100 may be, still depending on each particular embodiment, shared by multiple features 102, 104, 106 such as a number of model visualization windows 102, 104 and/or control input features, such as a number of function-associated user-selectable icons or a larger control panel, 106 simultaneously rendered in the view 100, potentially positioned adjacent and/or superposed relative to each other. Optionally, one or more of the features 102, 104, 106 may be user-relocatable within the UI responsive to e.g. drag-and-drop type control input as discussed also hereinlater.

In the UI, one preferred feature, such as a window or generally a (sub-)view, 102 is configured to depict a (model of a) substrate 103 and/or target circuit design 113 thereon in 2D domain. The circuit design 113 may include a circuit schematic or layout, comprising e.g. a number of electrical and/or electronic components 113B and/or conductive traces 113A connecting those, for instance, as being easily apprehended by a person skilled in the art.

One other preferred feature, such as other window or generally a (sub-)view, 104 is configured to depict a 3D representation (model) of a mechanical target structure (3D target design) 103B and said circuit design 113 obtained by processing such as 3D forming, optionally incorporating thermoforming or cold forming, the substrate 103 carrying the circuit design 113.

The target design/formed substrate 103B may exhibit a general 3D shape such as a curved shape (shown) due to forming. Alternatively or additionally, the target design/formed substrate 103B may define a number of spatially more limited, local 3D shapes 105A, 105B such as protrusions/recesses 105A of dome or hemi-spherical shape, for instance, or e.g. ridges/grooves 105B that are straight, curved or e.g. undulating.

Figure 1B:
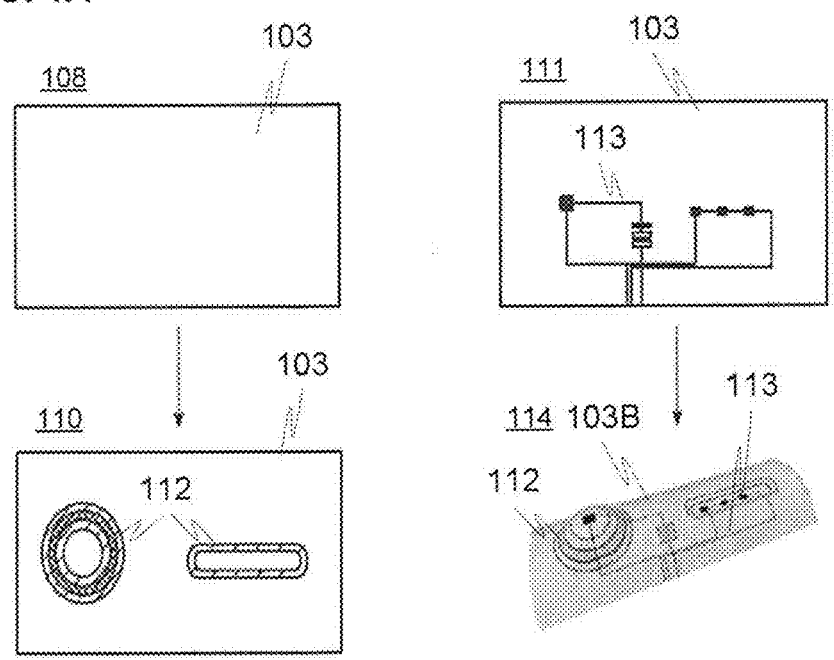
FIG. 1B illustrates various aspects of facilitated circuit layout design in accordance with an embodiment of the present invention.
Figure 1C:
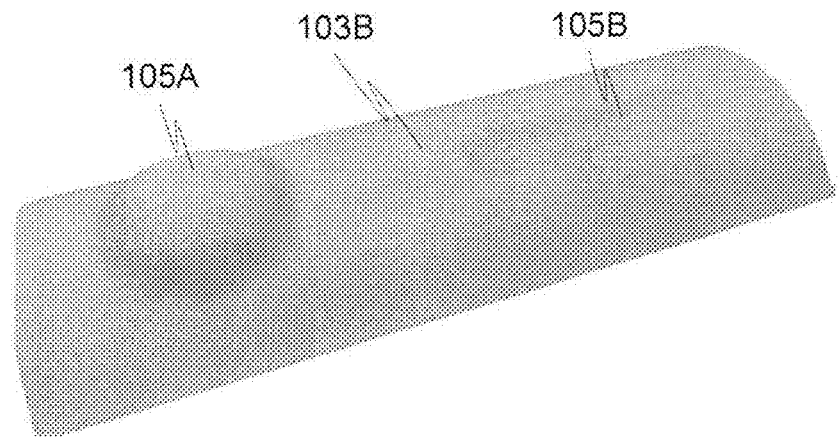
FIG. 1C illustrates an embodiment of a 3D target design, or its digital on-screen representation, obtained through actually forming, or at least simulating or generally modelling the forming, of an initial substrate that may be substantially planar.

Alternatively or additionally, in some embodiments the formed substrate 103B yielding the 3D target design could be rendered, utilizing a selected graphical projection technique, without features such as a circuit thereon, with reference to the example 116 of FIG. 1C.

Reverting to FIG. 1A, any two or more of the features 102, 104, 106 may be in some embodiments positioned adjacent to each other, e.g. side-to-side in horizontal direction or one below another. In some embodiments, any two or more of them 102, 104, 106 may alternately occupy or share substantially the same space or (sub-)view responsive to e.g. control input from a view switching feature.

In some embodiments, superpositioning the features 102, 104, 106 is enabled such that the features rendered topmost are at least partially shown transparent or translucent to enable inspecting several superposed features 102, 104, 106 simultaneously. Similar consideration applies to visualization of sub-features of a shown feature 102, 104, 106. For example, a substrate 103, 103B may be rendered transparent or translucent so that elements on any side thereof, such as circuitry 113, are simultaneously visible for inspection.

The control features 106 of the UI may enable a user to trigger and configure, e.g. via a touchscreen functionality, a mouse or other input-device based point-and-click operation, different operations to be executed (e.g. mappings, positioning of features/elements, material selections, view selection or object viewing angle selection, input and output file selection) e.g. having regard to the data on the mechanical target structure, circuit design, or forming process.

Accordingly, an operator (user) of the arrangement may conveniently inspect the models of mechanical 3D target design or formed substrate, initial substrate (e.g. planar film), circuit schematic, and/or circuit layout, and optionally further associated features such as graphics and/or thermally conductive/insulating features, in desired domain and configuration using several simultaneous (adjacent) or sequential views offered by the UI and controlled by the features 106.

Indeed, although not explicitly shown in the figure, preferably also graphical elements such as logos, pictures, symbols, etc. to be provided on the substrate or directly on the 3D target structure formed therefrom may be imported in and inspected, optionally further processed such as optimized, by the arrangement.

Heterogeneous features of the circuit design such as layout, conductive traces, components, etc. as well as graphics and/or thermally functional features such as thermal conductors or insulators may be preferably inspected via common view(s) of the UI.

As discussed hereinlater, by the arrangement printed features such as graphics and/or conductive traces may optionally be configured and optimized having regard to appearance thereof in addition to e.g. electrical properties as deliberated thoroughly having regard to circuit design (e.g. traces) hereinelsewhere.

As processing such as 3D forming of the substrate will distort printed features provided on substrate areas subject to elongation, distortion may be estimated by the arrangement based on e.g. the mapping and utilized in determining pre-distorted features to be provided on the substrate so that subsequent to processing such as 3D forming, the feature will attain its intended undistorted shape.

FIG. 1B illustrates various aspects of facilitated circuit layout design in accordance with an embodiment of the present invention.

At 108, object, i.e. substrate, 103 to be formed into a desired 3D target design is shown rendered utilizing a visually inspectable model based on e.g. obtained design input. In the example, the substrate 103 is essentially of rectangular shape and visualized accordingly, but it may naturally exhibit various alternative or additional angular or curved shapes such as edges or holes.

The substrate 103 may be shown via the UI of the arrangement as illustrated in the figure, thus using an essentially planar (e.g. top) view or suitable, optionally user-selectable and controllable (e.g. rotatable), graphical projection as discussed above having regard to feature 104 of FIG. 1. The necessary input characterizing the substrate 103 for visualization and other purposes such as mapping, may be provided via the UI and/or e.g. communication interface (e.g. in a digital file) to the arrangement. In addition or alternatively, the input may be at least partially defined by preferably user-adjustable settings stored at the arrangement and/or embedded e.g. in a used mapping technique by characterizing parameter values such as weight factors of e.g. projection or simulation model, for example.

At 110, the substrate 103 is illustrated with stretch or elongation indicators 112 illustrating the locations and respective amounts of elongation of the substrate 103, e.g. density, caused by 3D forming of the substrate 103 into a desired 3D target shape.

Characteristics of the 3D target design, managed e.g. via a related 3D model, may have been provided via the UI and/or communication interface (e.g. in a digital file, such as a (mechanical) CAD file) to the arrangement. The same applies to the characteristics of a forming method (type and/or related parameters such as pressure or temperature) to be used, or potentially user-adjustable, default type forming data may be alternatively just fetched from an internal data repository of the arrangement. Also the used mapping technique may itself inherently encode data regarding the used processing or specifically forming method as discussed above relative to substrate data. Based on the available details regarding the original substrate, forming method and 3D target design, proper mapping between the corresponding locations of the unformed substrate and 3D formed substrate establishing the 3D target design may be determined by a selected mapping technique, incorporating elongation information that may be visualized via the indicators 112.

Indeed, the aforementioned locations and amounts may be estimated based on the application of a mapping technique or mapping procedure suggested herein. The mapping technique exploits input characteristics of 3D target design, original substrate, and forming procedure as mentioned above to derive the mapping with stretch information. Accordingly, the operator of the arrangement may easily identify and inspect substrate areas subject to elongation responsive to forming when a visualization 110 of substrate 103 augmented with stretch/elongation information 112, is established by the arrangement. Based on the estimated elongation data and e.g. their visualization 112, the operator may position features such as a target circuit, graphics and/or other features on the substrate 103 so that they end up, in the light of forming, on preferred areas thereof, such as areas subject to a desired amount of elongation (e.g. minimal amount or sufficiently low amount), for example.

Figure 1D:
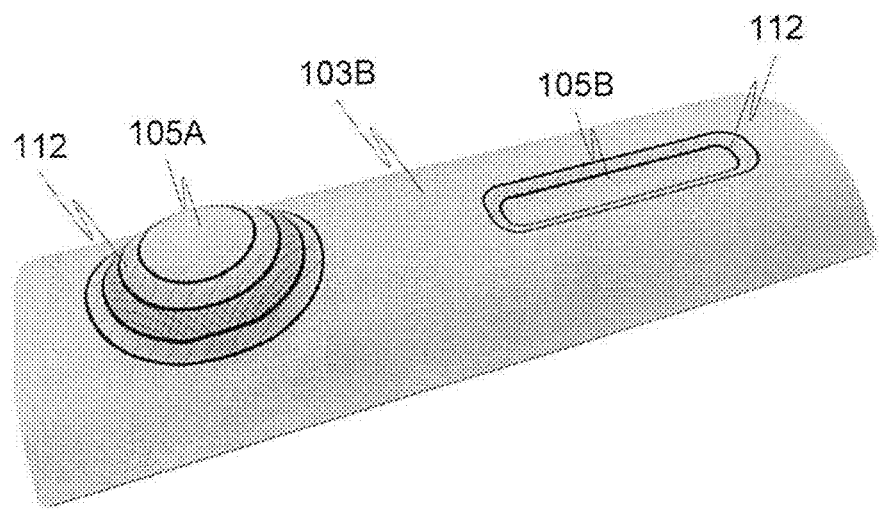
FIG. 1D illustrates the embodiment of FIG. 1C with stretch (density) indicators visualized thereon.

One alternative or supplementary option for visualizing or generally characterizing the substrate and associated elongation via the UI of the arrangement is provided in the example 118 of FIG. 1D. The shape of the 3D formed substrate 103B implementing the 3D target design is represented to the operator by means of a selected graphical rendering technique applying e.g. a selected a projection, together with indications 112 of material elongation properly positioned thereon.

In some embodiments, establishing a mapping between the locations of an unformed and formed substrate and related elongation characteristics may be sufficient from the standpoint of the arrangement or a method executed by it. The arrangement or related method may be configured to practically unfold the (model of) input 3D target design into unfolded initial substrate so that the output indicates the mapping between different locations of the unfolded and folded, i.e. unformed and formed, versions of the substrate; as the utilized mapping technique takes material elongation due to intended application of a selected forming procedure into account while establishing the mapping, local elongation characteristics such elongation factors or densities may also be explicitly indicated in the output. The output may be then forwarded to e.g. essentially 2D circuit design program involving layout design, e.g. a desired ECAD program, capable of properly interpreting and preferably also visualizing the obtained mapping and optional explicit elongation or stretch data. A user may then conveniently design the layout of a desired circuit and potential further features such as graphics, (other) optical and/or thermal features thereon while having an estimate of material elongation and location mapping characteristics on hand to avoid e.g. design pitfalls arising from positioning features in locations subjected to high stress and resulting stretch during forming.

However, in other embodiments, the arrangement/method of the present invention is further adapted to integrate a number of circuit design and circuit layout optimization features therewith as explained, by way of example only, below with reference to items 112 and 114.

At 111 of FIG. 1B, the substrate 103 to be formed is shown, with a circuit design 113 positioned thereon. The circuit design 113 may be input to the arrangement via the UI and/or provided thereto using a digital file from e.g. electronics design program such as compatible circuit schematic or layout design program. Preferably, the operator is provided with UI (control input) features to alter the general configuration such as positioning of the circuit design 113 (e.g. move left, right, up, down) and correspondingly visualize the outcome of such configuration activities, optionally in substantially real-time fashion depending on the complexity underlying the changes made.

Further optionally, various circuit layout design features or at least optimization features, which may be user-controlled, -assisted and/or substantially fully automated, to alter the circuit design more thoroughly may be provided by the arrangement. An ECAD may thus be selectively implemented by the arrangement or method of the present invention. For example, a number of features to change the characteristics of individual circuit elements such as trace lengths and/or other dimensions, their positioning, materials and/or routes, and/or type or positioning of individual components could be provided to the operator by the UI of the arrangement. Optionally, also the indicators 112 could be shown together with circuit design 113 and substrate 103.

In addition to mere visualization, configuration of the circuit 113 on the substrate 103 (i.e. indication of their mutual configuration such as location and e.g. alignment of a certain circuit element such as trace 113A or component 113B on the substrate) is preferably stored for output, optimization and/or mapping purposes.

Yet, in different embodiments, the visibility of various features 103, 112, 113 e.g. in a common view, such as view 111, could be generally made user-selectable by the operator via the UI.

In this particular example, the circuit design 113 may have been initially established and provided to the arrangement essentially in 2D domain, utilizing e.g. a selected ECAD format supported by the arrangement. Based on the determined mapping that yields correspondence between locations of the unformed and formed substrate as well as localized estimates of material elongation due to 3D forming of the hosting substrate to achieve the target design, the formed substrate 103B (model) establishing the 3D target design may be visualized, as illustrated at 114, together with a duly mapped circuit 113 thereon. Based on the visualization, the operator may further optimize the layout. The arrangement may support, instead of or in addition to the aforesaid UI control over the 2D design at 112, changing the circuit design in 3D domain through supporting re-positioning of overall circuit layout and/or associated features, e.g. one or more electronic components, such that the changes made are adopted in the digital model of the circuit and correspondingly spatially (location-wise) locked with the model of the formed substrate 103B.

In some other embodiments, at least portion of the circuit design 113 could be initially provided in 3D domain based on e.g. at least partial 3D model of the circuit layout. The 3D model of the circuit layout could be input to the arrangement e.g. as a digital file and/or defined via the UI directly in 3D domain by configuring a number of related circuit features such as components and/or traces e.g. onto a rendered 3D model of the formed substrate/mechanical 3D target design.

Figure 2:
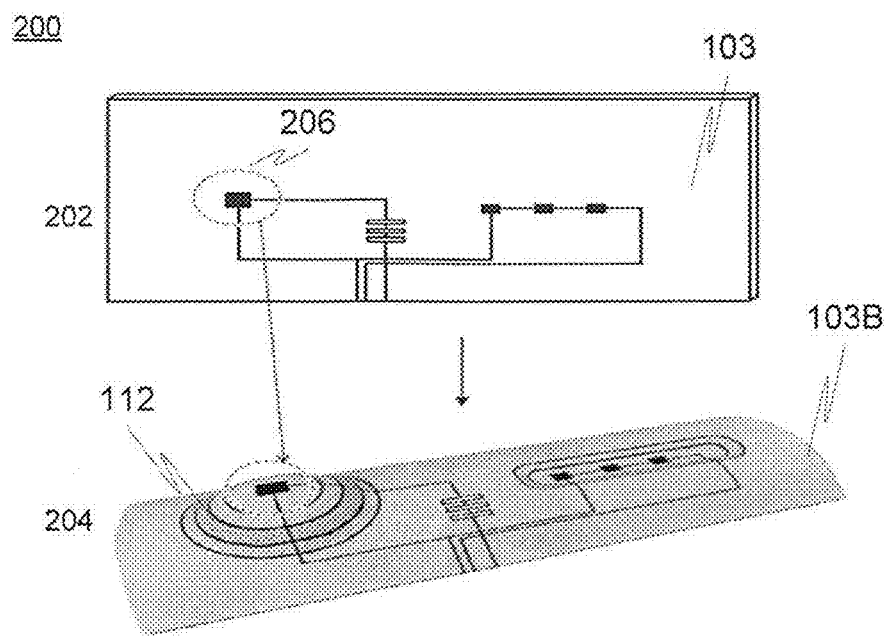
FIG. 2 illustrates one embodiment of 2D to 3D workflow in accordance with the present invention.
Figure 3:
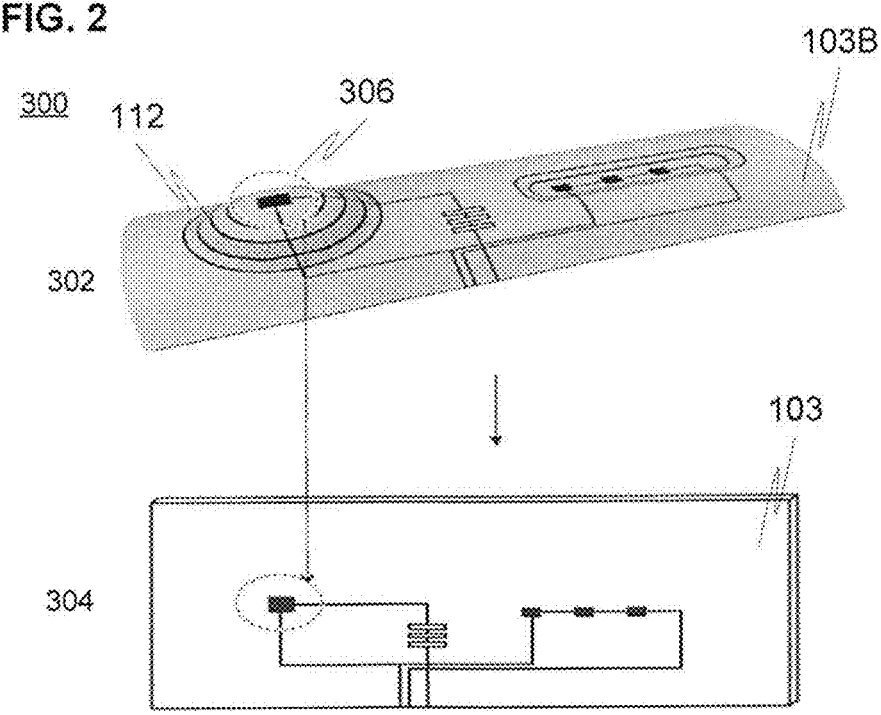
FIG. 3 illustrates one embodiment of 3D to 2D workflow in accordance with the present invention.

FIG. 2 illustrates one embodiment of 2D to 3D workflow in accordance with the present invention whereas FIG. 3 illustrates one embodiment of 3D to 2D workflow in accordance with the present invention. As discussed above and hereinelsewhere, the present invention may be capitalized in circuit layout design in a variety of ways, depending on the embodiment.

In the example 200 of FIG. 2, a model of a target circuit design is positioned on a model of unformed/initial substrate, with reference to item 202. As the design input obtained further characterizes the mechanical 3D target design or target structure to be obtained by forming and a selected forming process to be exploited, the arrangement is capable of and harnessed into establishing a mapping indicative of the correspondence (still being an estimate as being appreciated by a skilled person) between the locations of the two states (unformed/formed) of the substrate and local elongation characteristics (e.g. amount and/or direction) of the substrate due to processing such as forming, which are taken into account in location mapping. Item 204 refers to a model of the 3D target design as provided by the formed substrate with the mapped circuit design and illustrative elongation indicators 112 thereon. Item 206 highlights how a particular location of a component may map, or translate, between the two states of the substrate.

Also the UI provided by the arrangement in accordance with an embodiment of the present invention or by an external device served with digital output from the arrangement, may be adapted to e.g. graphically indicate a mapping between selected, e.g. operator (user)-selected, locations of the two states of the substrate. The graphical indication may include line, arrow and e.g. circular shapes as shown, or be based on e.g. similar or essentially same color, pattern, shading or other visually detectable similarity between the mutually corresponding locations of or on the two states of the substrate. The operator may inspect by the position mapping and related elongation data whether the 3D target design, substrate, selected forming process and/or circuit design fulfil a number of criteria set for them from the standpoint of both 2D and 3D domains, or corresponding states (unformed/formed), of the substrate. Different optimization tasks may be manually and/or automatically (based on e.g. user-adjustable and/or fixed optimization criteria) executed having regard to either domain or state of the substrate or related circuitry so that the resulting modifications are automatically translated to the remaining domain or state.

In the example of FIG. 3, the situation is reverse in a sense that the circuit design (layout) has been defined relative to the 3D target design to be obtained by 3D forming of the substrate. The mapping is again established with elongation data and the operator may be provided with a graphical notation of correspondence between selected locations 306 of the two states (unformed 304/formed 302) of the substrate and possible circuit features thereon.

In some embodiments, the operator may manually select using e.g. the UI, or it may be automatically determined relying upon a related predetermined logic, a reference mapping by defining at least one reference point or generally reference location of the model of 3D target design and a corresponding point of the model of the unformed substrate to be generally followed and adopted by the mapping. Accordingly, if e.g. the initial substrate has larger surface area than the target 3D design (i.e. the target 3D design unfolds by the mapping to a sub-area of the overall initial substrate), the mapping is duly constructed such that it follows the indicated reference mapping.

Figure 4:
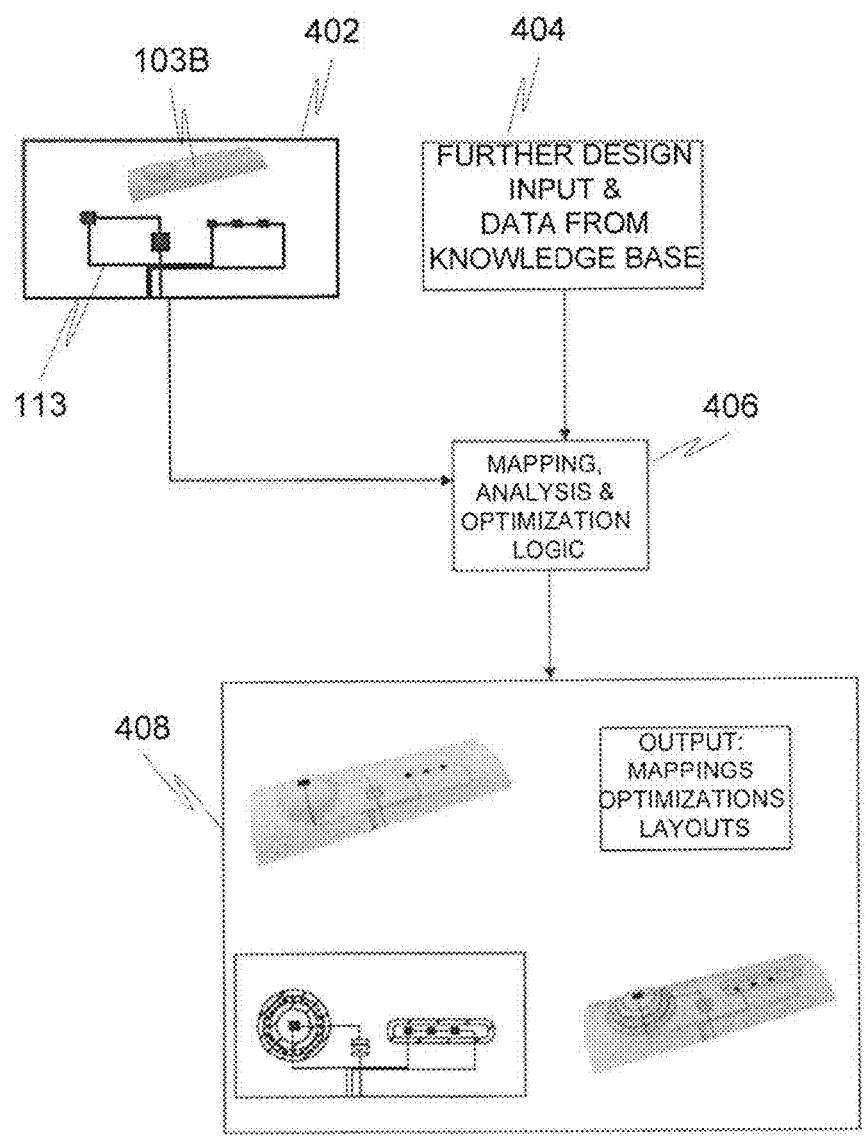
FIG. 4 illustrates different features and related concepts of various preferred embodiments of the present invention via a combination of high-level block and flow diagrams.

FIG. 4 further illustrates the above and other features, and related concepts, of various preferred embodiments of the present invention via a combination of high-level block and flow diagrams.

Item 402 refers to design input characterizing the 3D target design, i.e. design established by the formed substrate, 103B and circuit design 113 to be provided on the substrate.

Item 404 refers to further design input characterizing the substrate itself as well e.g. the utilized forming procedure.

In various embodiments, a data repository, such as one or more databases or so-called knowledge bases, may be arranged in internal and/or external memory accessible by the arrangement in accordance with an embodiment of the present invention. For example, material information may be stored in the repository for utilization during mapping, analysis and e.g. optimization tasks, having regard to e.g. substrate material, conductive material, conductive trace material, component material, electrically insulating material, or adhesive material. In various embodiments, material such as any one or more of the above materials may be further characterized in the design input and/or digital output.

In various embodiments, materials may be characterized in the repository, design input and/or output, in terms of e.g. electrical conductivity, volume resistivity, dielectric strength, current density, thermal conductivity, tensile strength, ductility, plasticity, stiffness, impact strength, mold shrinkage, coefficient of thermal expansion, chemical resistance, heat deflection, hardness, and/or flammability.

Yet, the repository may store information about forming processes (e.g. applicable parameters such as duration, pressure and temperature, and their effect on different materials).

Still, the repository may optionally store information about manufacturing and/or mounting (e.g. SMT, surface-mount technology) methods regarding traces, components and/or other (circuit) features to be provided on the substrate, such as characteristics of printed electronics technology (e.g. screen printing or ink jetting) and/or component mounting techniques.

In various embodiments, the design input to be received, or particularly, captured via a UI, may characterize mechanical 3D target design (target structure), optionally via a mechanical CAD model, to be produced through 3D forming of a substrate.

Additionally or alternatively, the design input may characterize target circuit design, defined e.g. in 2D and/or 3D domain, to be provided on the substrate. For example, components and/or connecting traces may be characterized in terms of their properties (material, conductivity/resistance), dimensions, connections and/or location. Yet, provision type such as manufacturing and/or mounting method(s) (e.g. printed electronics technology, such as screen printing or ink jetting) may be indicated in the input.

Additionally or alternatively, the design input may characterize substrate, such as material and thickness or generally dimensions thereof, optionally represented via a digital model and/or a number of related parameters. The substrate may refer to an initially substantially planar thermoplastic film, for example.

Additionally or alternatively, the design input may characterize preferred or required 3D forming process, such as type of forming process, temperature, pressure and/or other parameters or attributes thereof.

In various embodiments, the design input and/or information to be stored in the repository for immediate or future utilization may be obtained via a communication interface and/or user interface of the executing arrangement. The arrangement may further store, in a memory, default settings, which are optionally user-adjustable, defining at least part of the design input such as preferred substrate characteristics and/or preferred forming process characteristics. The communication interface may refer to a wired or wireless network interface and the data source(s) may include CAE, such as CAD, software.

In various embodiments, the design input may characterize one or more optical features, optionally light control, informative and/or decorative features, such as graphics, masks, lightguides, or mirrors, further covered by the mapping.

In various embodiments, the design input may comprise a number of user-defined design requirements that the arrangement is configured to essentially follow in determining the mapping or output.

Additionally or alternatively, the design input may comprise a number of user-defined design preferences that the arrangement is configured to selectively replace with design options determined more suitable according to selected criteria. The preferences may be considered as guidelines that may not have to be strictly followed in contrast to the aforesaid more definitive requirements.

In various embodiments, the design input may in particular characterize design requirements or preferences concerning an electrically conductive or insulating feature to be provided on the substrate, such as a conductive trace of the circuit design or the circuit design in general, or insulating feature such as a layer or plate of material to reduce or prevent electrical connection between e.g. circuit features, in terms of minimizing or maximizing the associated surface area on the substrate, minimizing or maximizing electrical resistance, conductance and/or material elongation following 3D forming of the substrate, and/or using or avoiding one or more selected materials in the construction, whereupon the arrangement is configured to utilize said requirements or preferences in optimizing or generally determining the layout of the feature or related circuit design based on the mapping, and indicate the result in the output.

In various embodiments, the design input characterizes at least part of a circuit schematic, optionally circuit layout, of the circuit design in 2D and the arrangement is configured to optimize the layout, such as positioning, of one or more associated circuit features or specifically elements, such as conductive traces, pads and/or components, on the substrate based on the mapping and selected positioning criteria, such as physical stretch and/or electrical resistance minimization, and indicate the result in the output.

In various embodiments, the design input characterizes at least part of the circuit design, such as of related layout, in 3D and the arrangement is configured to determine the positioning of said at least part of the circuit design on the substrate based on the mapping.

In various embodiments, the design input comprises at least one element selected from the group consisting of: digital 3D model of the mechanical target design, a CAE such as CAD file comprising the digital 3D model of the mechanical target design, indication of circuit schematic, ECAD file describing a circuit schematic, indication of circuit layout, digital file describing circuit layout, Gerber file or description (indicative of e.g. circuit layout), PDF file (portable document format, indicative of e.g. circuit schematic or layout), IDF file describing a circuit layout, image file describing a circuit layout, indication of substrate material, indication of substrate thickness, indication of substrate dimensions, digital model characterizing the substrate, and indication of substrate properties.

In the design input (and/or output) the concerned software or entity with whom data is transferred and/or whose data or specifically file format is utilized may include, being however not limited to, Dassault™, Siemens™ or Autodesk™ in terms of e.g. mechanical/structure design CAD programs, Abaqus™ in terms of simulation software, Altium™ and Mentor™ in terms of ECAD, and/or SPEOS™ or Zemax™ in terms of optical design.

In various embodiments, the target circuit (design) may comprise at least one element selected from the group consisting of: electrically conductive trace, contact pad, electrode, electronic component, electromechanical component, electro-optical or optoelectronic component, radiation-emitting component, light-emitting component, LED (light-emitting diode), OLED (organic LED), side-shooting LED or other light source, top-shooting LED or other light source, bottom-shooting LED or other light source, radiation detecting component, light-detecting component, photodiode, phototransistor, photovoltaic device, sensor, micromechanical component, switch, touch switch, proximity switch, touch sensor, proximity sensor, capacitive switch, capacitive sensor, projected capacitive sensor or switch, single-electrode capacitive switch or sensor, multi-electrode capacitive switch or sensor, self-capacitance sensor, mutual capacitive sensor, inductive sensor, sensor electrode, UI element, user input element, vibration element, communication element, data processing element, data storage element, and electronic sub-assembly.

Yet, the circuit may include at least one element selected from the group consisting of: microcontroller, microprocessor, signal processor, DSP (digital signal processor), programmable logic chip, memory, transistor, resistor, capacitor, inductor, electrode, memory array, memory chip, data interface, transceiver, wireless transceiver, antenna, remotely readable contactless tag (e.g. radio-frequency identification, RFID, tag or near-field communication, NFC, tag), transmitter, receiver, wireless transmitter, and wireless receiver.

The included components may include passive components, active components, packaged components, ICs (integrated circuit), printed, such as screen printed, components and/or electronic sub-assemblies. For instance, one or more components may be first provided on a separate substrate, e.g. a circuit board such as an FPC (flexible printed circuit)

or e.g. rigid, e.g. FR4 type (flame retardant), board, and subsequently attached as a whole (i.e. as a sub-assembly) to the target substrate.

In various embodiments, the arrangement may be configured to dynamically or e.g. iteratively receive design input indicative of a desired change in the previously provided input, supplementary input, or a desired change in the output previously provided by the arrangement, and further configured to re-determine the mapping and/or the output based thereon.

In practice, the operator (user) of the arrangement may, for example, test and try, optionally through simulation, projection and/or other models supported by the arrangement, different options regarding substrate, circuit, substrate, forming process and/or other features (e.g. optical features) and their effect on the end result, whereupon the arrangement is arranged to receive e.g. substitutive or supplementary design input via the communication interface and/or UI, for example, for adapting the current models of unformed and/or formed substrate and related features, such as circuit design, thereof in response to enable the operator to inspect the outcome and further adjust the associated characteristics, if necessary. When the operator is happy with the outcome, he/she may through the UI of the arrangement, instruct the arrangement to provide the digital output for further utilization, such as printing, electronics assembly and/or forming.

Item 406 refers to mapping, analysis and optimization logic, which analyses the design input and data matching therewith in a data repository (the data repository contains information characterizing the materials and processes potentially applicable in forming a 3D target structure from a substrate) and possible further control input indicative of e.g. optimization criteria, determines the mapping between the initial/unformed and processed, typically formed, substrate.

In various embodiments, the mapping technique incorporates simulation, preferably finite element analysis based simulation. Integral or external simulation solution, e.g. software entity or software module, may be utilized for the purpose.

In various embodiments, the mapping technique incorporates 3D projection such as map projection, which may be utilized generally or to produce selected portion(s) of overall mapping only, i.e. locally.

In various embodiments, the mapping may be essentially surjective, optionally substantially bijective at least in places, from 3D target design to the unformed substrate.

In various embodiments, the arrangement may be configured to determine substrate behaviour, optionally via offset vector mapping, indicative of a related amount and optionally direction of elongation, optionally elongation percentage, elongation density or elongation factor, at a number of different locations of the substrate, optionally of essentially point or region type, based on the design input characterizing at least said 3D mechanical target design.

In various embodiments, the arrangement may be configured to determine the material, material characteristic, composition, thickness, length, or width of conductive element, such as trace or pad of conductive ink, or of electrically insulating material to be provided on the substrate based on a bend radius implied by the 3D target design. For example, bend radius small enough may translate into utilizing conductive material such as ink that tolerates such bend radiuses resulting from the forming of the substrate, for example.

In various embodiments, the arrangement may be configured to preferably visually, such as graphically and/or numerically, indicate via the UI and/or generally in the digital output (if e.g. including data to be visualized by a receiving device or system), such as a digital, computer-readable file, a related estimated amount and optionally direction of elongation, optionally elongation density, elongation percentage and/or elongation factor, at a number of locations of the substrate. For example, numeric indicators, arrows, lines such as contour lines, graphical (e.g. line) patterns, shadings and/or colors could be utilized.

Additionally or alternatively, surface shapes (recesses, protrusions, bends, etc.) could be generally indicated in a similar fashion.

In various embodiments, the arrangement may be configured to visually indicate, via the UI and/or generally, via the digital output (if including data to be visualized), the mapping. For example, selected locations such as point type locations or (larger) region type locations may be graphically connected together by connecting element such as an arrow or line, or same/similar colors and/or patterns may be utilized for the purpose.

In various embodiments, the arrangement may be configured to determine an estimate of an electrical property of e.g. conductive (e.g. trace or pad) or insulating feature. The property may include e.g. resistance or conductance, respectively. The property may be determined by utilizing information available e.g. in the data repository, such as material conductivity or resistivity information. Yet, e.g. dimensional information regarding the feature may be utilized in the determination (e.g. material layer thickness, length, cross-sectional area and/or width). The available information may be fed in a selected formula (equation) or generally analysis logic supported by the arrangement as being appreciated by a person skilled in the art. The arrangement may be provided with a number of pre-programmed analysis logics for the purpose, and/or it may support user-defined ones. For example, resistance of a conducting element could be estimated by equation: resistance=resistivity×length/cross-sectional area (correspondingly, conductivity is inverse of resistivity). In turn, the resistivity may depend e.g. on the material composition such as configuration of conductive particles therein as contemplated hereinelsewhere, which may further affect the resulting change in the resistance/conductance of the element when subjected to forming and thus elongation together with the substrate.

The determined property such as the resistance of an analysed feature, may be utilized as one optimization criterion for automated or at least operator (user)-assisted optimization, such as optimization of the configuration of the circuit design (e.g. layout or specifically location selection, trace route selection, material selection, material concentration or configuration selection as to conductive particles therein, component selection, component location selection, dimensions (width, thickness, etc.) selection).

In various embodiments, different estimations and/or optimizations could be performed feature-wise (e.g. electronic or electric component, trace, pad, insulator, etc.) and/or in point-to-point, planar (2D) or 3D, fashion having regard to the circuit, insulating feature, and/or substrate, for example, of the target design e.g. in a state following the forming of the substrate, during forming and/or prior to forming.

In various embodiments, the arrangement is configured to identify, based on one or more identification or identifiable cues detected in the circuit design of the design input, such as in a digital file or user control input, a plurality of stacked conductive layers upon a common surface of the substrate separated by electrically insulating layers in between, and preferably further configured to optimize the configuration such as layout of each or at least one stacked conductive layer and adjacent insulating layer based on the mapping so that e.g. no short circuit will result unless detected also in the original circuit design of the design input. The cues may refer to predefined implicit/indirect or explicit indicators detectable in the input.

For example, in the above and/or other optimization scenarios, the arrangement may be provided with detection logic that monitors and acts upon the design input such as inputted circuit layout in terms of features such as shapes, materials, parameter values such as resistance or other electrical characteristic, and/or mutual configuration such as distance of one or more features, e.g. conducting features. The detection logic may be configured to infer the intended function or purpose of the features.

For instance, stacked or immediately adjacent two features, one assigned with low resistance in the input and other assigned with high resistance (according to the selected, e.g. predefined or user-adjustable criteria), could be translated into conductor and insulating features, respectively, by the arrangement. Detections could be made also on the basis of the shape of the elements. If e.g. two longer features with lower resistance seem to have e.g. a more local feature with higher resistance in between at a crossing thereof, the local feature may be deemed an insulator.

Accordingly, the optimization procedure may utilize the detection results. For example, the related analysis logic may be configured to prevent or at least alarm about cases wherein e.g. deformation of the associated features due to elongation caused by forming of the substrate, causes a short circuit or reduces the electrical insulation considerably, i.e. changes the functioning of the circuit as originally determined based on the detection results, according to selected criterion.

In various embodiments, the arrangement may be configured to determine, based on explicit data in the design input and/or on estimation procedure utilizing e.g. material information and dimensions provided in the input, at least one electrical characteristic such as resistance or conductance of one or more features, such as traces or components, of the circuit design when additively produced, such as printed, or mounted, on the substrate and subjected to elongation due to 3D forming of the hosting substrate, and preferably take the characteristic and its behaviour responsive to elongation into account in optimizing the configuration having regard to at least one property, such as location, material, cross-sectional area, thickness and/or width of the features based on the mapping. For example, if electrical resistance of a conducting feature (e.g. trace) is estimated to rise due to stretching from the input one, it may be compensated by a countermeasure, e.g. increasing thickness thereof.

Generally, the arrangement may be configured to optimize at least one property, such as the location, route, material, cross-sectional area, thickness and/or width, of one or more features of the circuit design, wherein the optimization objective includes at least one element selected from the group consisting of: resistance minimization, material use minimization (e.g. in terms of weight or concentration, such as concentration of conductive particles in conductive ink) and/or material cost minimization.

Item 408 refers to output such as a digital file indicative of the mapping, optimization measures, resulting circuit layout on the unformed and/or formed substrate, stretch details, etc.

In various embodiments and in the light of the foregoing, the arrangement may be configured to determine a selection, substitution, alternative or recommendation, to be indicated in the output, based on the design input and information in the data repository, concerning at least one element regarding the circuit design, 3D target design and/or the substrate, selected from the group consisting of: substrate material, substrate dimensions, substrate shape, process parameter, forming method, forming parameter, forming temperature, forming pressure, forming time, conductive material, conductive ink, conductive adhesive, non-conductive adhesive, resin, location of one or more features such as elements of the circuit design, location of one or more features such as elements of the circuit design on the substrate prior to (3D) forming, circuit layout of the circuit design on the substrate prior to and/or subsequent to forming, component location, component location on the substrate prior to forming, via or feedthrough location, via or feedthrough dimensions, via or feedthrough material, conductive trace or pad width, conductive trace or pad thickness, conductive trace or pad location, conductive trace or pad shape, conductive trace route, conductive trace bend, conductive trace bend radius, conductive trace or pad length, conductive trace material, topological feature of the 3D target design, shape and/or size of a topological feature of the 3D target design, level of curvature or bend radius of a topological feature of the 3D target design, and configuration such as material, shape, dimensions and/or location of an optical feature at the substrate for controlling visible and/or non-visible light such as a lightguide, reflector, optical mask, absorber or diffuser.

In various embodiments, the output may comprise at least one element selected from the group consisting of: a CAE file, indication of circuit schematic, indication of circuit layout, ECAD file describing a circuit layout, IDF file describing a circuit layout, a print instruction file for printing at least part of the circuit design, e.g. traces, on the substrate, file containing instructions for 3D assembly of a number of electronic components, image file describing a circuit layout, indication of substrate material, indication of substrate thickness, indication of substrate dimensions, and indication of substrate properties.

In various embodiments, the arrangement may be configured to provide, in the output, a collection, such as a list, of suggested alternative options regarding the circuit layout of the circuit design, forming process, 3D target design and/or substrate, preferably in the order of superiority according to a selected criterion.

As explained hereinbefore, in some embodiments the arrangement may be configured to dynamically, preferably in substantially real-time fashion, react on dynamically received design input. Generally, to improve response speed, an initial estimate of a final response could be first provided based on coarser analysis, whereas the final response based on more accurate analysis could be executed in the background and issued via the UI/output when ready. Nevertheless, e.g. in the above example regarding collections, e.g. a received operator-selection of preferred one or more options could trigger the arrangement to re-determine the configuration of the circuit layout, 3D target design, forming process, and/or substrate, as well as the digital output to reflect the changes introduced. In many cases, the mapping would change and should be updated as well.

In various embodiments, the arrangement may be configured to provide at least part of the output specifically utilizing display data to be signalled to the user via a display or a projector. In some embodiments, such display, projector or other applicable UI output device may form at least part of the UI of the arrangement and may be considered as comprised in the arrangement.

Figure 5:
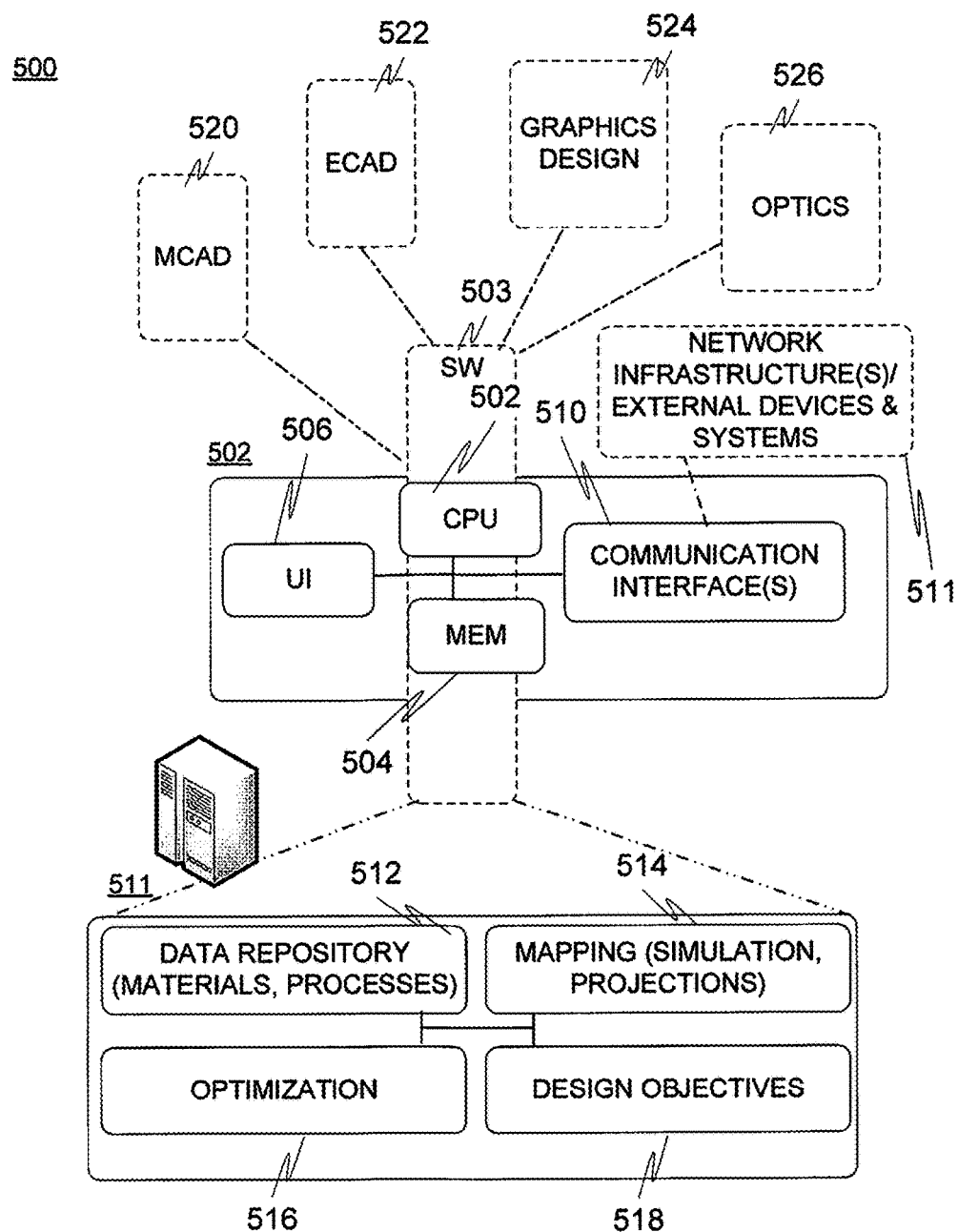
FIG. 5 is a block diagram representing an embodiment of the arrangement in accordance with the present invention and related external or integrated (depending on the embodiment) features and entities.

FIG. 5 incorporates a block diagram 500 representing an embodiment of the arrangement in accordance with the present invention and related external or integrated (depending on the embodiment) features and entities. Yet, a related, merely exemplary, block diagram from more functional standpoint is shown at 511.

The arrangement may comprise one or more (in the latter case, at least functionally connected) electronic devices such as one or more servers optionally residing in a cloud computing environment, a personal computer device (e.g. laptop or desktop computer), or a portable terminal device (e.g. smartphone), or any combination of such, operatively connected, devices, for example.

At least one processing unit 502 such as a microprocessor, microcontroller and/or a digital signal processor may be included. The processing unit 502 may be configured to execute instructions embodied in a form of computer software 503 stored in a memory 504, which may refer to one or more memory chips, for example, separate or integral with the processing unit 502 and/or other elements. The memory 504 may store various further data in addition to mere program instructions. It may, for example, host the aforementioned data repository.

The software 503 may define one or more applications for executing the activities described herein. A computer program product comprising the appropriate software code means may be provided. It may be embodied in a non-transitory carrier medium such as a memory card, an optical disc or a USB (Universal Serial Bus) stick, for example. The software could also be transferred as a signal or combination of signals wiredly or wirelessly from a transmitting element to a receiving element.

One or more data repositories such as database(s) as discussed hereinbefore may be established and maintained in the memory 504 for utilization and cultivation by the processing unit 502.

UI (user interface) 506 may provide the necessary control and information access tools to the operator (user) for controlling the arrangement and inspecting the output. For example, the operator may be enabled to provide at least part of the design input and/or information to be stored in the data repository via the UI. Yet, the digital output may be at least partially provided via the UI.

The UI 506 may include local components for data input (e.g. keyboard, touchscreen, mouse, voice input) and output (display, audio output), and/or remote input and output optionally via a web interface, preferably a web browser accessible interface, which could be accessed via a terminal such as personal computer or smartphone even if not considered to form integral part of the arrangement. The arrangement may optionally host or be at least functionally connected to a web server, for instance. The arrangement could be provided as Software as a Service (SaaS) to its users (herein "operators"). In some embodiments, an SDK (software development kit) or API (application programming interface) could be provided to connect or integrate the arrangement with external software such as existing ECAD and/or mechanical CAD tool. The arrangement could be provided as software module or component for use with other software, such as the aforesaid CAD(s), or specifically in between them for converting, adapting and/or supplementing data obtained therefrom, for instance.

Accordingly, the depicted communication interface 510 refers to one or more data interfaces such as wired network and/or wireless network interfaces, or in practice network adapters (e.g. selected local area network standard-compliant adapter) from the standpoint of a single device, for interfacing a number of external devices and systems for data input and output purposes. Such external entities as well as the one or more component devices of the arrangement may be accessible via a communications network 511 such as the internet. As alluded to above, UIs 506 such as web-based UI or other remote UIs may be partially enabled by means of the communication interface 510.

In some embodiments, the arrangement may comprise or be at least functionally connected, e.g. via the communication interface 510, with design software tools such as MCAD 520 (mechanical CAD), ECAD 522, graphics/graphical design 524 and/or optical design 526 tools mentioned hereinbefore. The tools may be included in the common software with e.g. mapping and/or optional optimization features of the present invention, or provided in separate software that is at least functionally linked therewith, physically running in shared or different hardware.

In some embodiments, the arrangement may comprise or be at least functionally connected e.g. via the interface 510, with manufacturing equipment such as electronics printing, component mounting, and/or forming equipment to provide e.g. the digital output thereto for controlling purposes.

Switching over to one possible representation 511 of functional entities, or modules, the arrangement may be considered to implement, potential features of and data stored in the data repository 512 have been already discussed hereinearlier somewhat comprehensibly.

The data repository 512 may indeed comprise information regarding at least one element selected from the group consisting of: substrate materials, printing materials, graphics printing materials, thermally conductive materials, thermally insulating materials, electrically insulating materials, electrically insulating printing materials, electrically insulating inks, conductive printing materials, conductive inks, conductive adhesives, non-conductive adhesives, stretching characteristics of substrate materials, elongation or stretching characteristics of conductive inks, conductive traces, conductive contact pads, electronic components and printable electronic components.

Various materials such as applicable substrate material, conductive material, conductive trace material, solder material, (electronic) component material, electrically insulating material, and/or adhesive material, may be characterized in the information stored in the data repository 512 (and/or provided in design input or digital output) e.g. in terms of at least one property potentially utilized in determining the mapping, related optimization and/or output, and preferably selected from the group consisting of: electrical conductivity, volume resistivity, dielectric strength, current density, thermal conductivity, tensile strength, ductility, plasticity, stiffness, impact strength, mold shrinkage, coefficient of thermal expansion, chemical resistance, heat deflection, hardness, and flammability.

In some embodiments, also optical characteristics of materials, such as substrate materials or conductive materials, could be indicated in the stored information with reference to indication of optical transparency at selected wavelengths (e.g. visible light), for example.

The design input may further contain preferences or requirements regarding optical and/or thermal properties of at least certain portions of e.g. the substrate or 3D target design formed therefrom, and/or of features (traces, components, insulator features, etc.) thereon. Such preferences or requirements may be taken into account in the execution of various optimization tasks such as configuration of the circuit layout in terms of location and/or material on the substrate.

Having regard to listed substrate materials, they shall generally comprise 3D formable (i.e. formable into non-planar and thus essentially 3D shape), such as thermoformable, materials. The listed formable material may be thermoplastic material, for instance. Such substrate material may include e.g. polymer, PMMA (Polymethyl methacrylate), Poly Carbonate (PC), copolyester, copolyester resin, polyimide, a copolymer of Methyl Methacrylate and Styrene (MS resin), glass, and/or Polyethylene Terephthalate (PET). Yet, the listed substrate material may additionally or alternatively comprise at least one natural and often, but not necessarily, organically grown material or material layer selected from the group consisting of: wood, solid wood, veneer, plywood, bark, tree bark, birch bark, cork (comprising phellem layer of bark tissue), natural leather, and natural textile or fabric material (which may be weaved or knitted, or otherwise produced, from natural fibers, for example) such as cotton, wool, linen, silk, or alike. As being clear, some of the above options overlap and may occur simultaneously with reference to e.g. wood and veneer or plywood. The included substrate materials may optionally be of composite type and contain a plurality of materials and/or material layers, which may be mutually different in terms of included materials or other configuration. Components (constituents) may be identified or characterized in the repository in connection with the description of the overall composite material.

Still, a number of forming processes, such as thermoforming, vacuum forming, cold forming, pressure forming, etc. may be identified or characterized in the information stored. For example, applicable or default/typical parameters or parameter ranges in terms of e.g. duration, temperature and/or pressure may be characterized.

Generally, the information stored in the data repository 512 may further indicate mutually compatible material and process (or in more detail, compatible process parameters) configurations, such as substrate and/or circuit materials vs. forming and/or manufacturing(/mounting) processes. Such compatibility data could be utilized by the arrangement in (input) verification and/or optimization tasks, for example.

Optionally, the repository 512 may contain information on manufacturing (preferably at least printing, such as screen, ink jet and/or other forms of (additive) printed electronics technology) and/or mounting processes regarding electronics and/or other features (e.g. optical features, such as a waveguide/lightguide, and/or thermally functional elements).

For example, information regarding feasibility of different shapes, dimensions (e.g. achievable resolution) or structures per printing technology could be included. The information could be utilized by the arrangement e.g. in the optimization of the configuration of circuit features on the substrate to avoid introducing or recommending practically unfeasible solutions, for example.

Having regard to mounting of e.g. electronic components, e.g. stored properties of fixing solder and/or adhesive (e.g. indication of elasticity, optionally elastic modulus) could be compared against the curvature of the corresponding substrate located subsequent to forming to determine whether the particular adhesive or location is feasible or not, which could be again utilized in the optimization and selection of material and/or determination of e.g. position of the concerned item such as a circuit layout or a feature (e.g. a certain component) thereof.

Mapping module 514 is configured to utilize one or more, optionally user-adjustable or -selectable, mapping techniques including e.g. simulation, optionally of generally finite element type, and/or projection techniques, optionally of generally map projection type, to determine the mapping between the locations of the unformed and formed and at thus at least locally deformed (elongated) models of the substrate (3D target design).

Yet, upon mapping the arrangement may be configured to verify, against predefined and/or dynamically (operator-) adjustable criterion, whether the desired 3D target design can indeed be reliably obtained through forming of an initial substrate in cases wherein the initial substrate has been defined in the design input in terms of e.g. material and dimensions, or preferably at least thickness, of a related sheet, layer, or other intended initial workpiece. The arrangement may be configured to indicate verification result in the digital output such as file outputted or via the UI. Alternatively or additionally, the arrangement may be configured to determine and indicate at least one configuration of suitable initial substrate (material and/or dimensions such as thickness) that is estimated to provide the 3D target design without high risk of e.g. material failure during or after forming.

Optimization module 516 may be provided for executing various optimization tasks as discussed hereineartlier. It may, for example, be configured to optimize the configuration of the circuit layout on the substrate, including overall location, feature (e.g. trace) or component location, related materials, dimensions, shapes, and/or routes according to selected, e.g. predefined or dynamically (operator-)adjustable, optimization criteria. Additionally, e.g. process (forming) and/or substrate characteristics may be optimized.

Design objectives element 518 may host data on such optimization criteria as well as various design input data characterizing the current target circuit design, 3D target design (mechanical structure), substrate, and/or forming process, for example.

The operator may in some embodiments define e.g. in the design input or further control input, a sub-set of all theoretically possible optimization options, such as processes or materials characterized in the repository 512, available for optimization based on e.g. real-life constraints. Namely, in a real-life scenario, only a limited number of materials (e.g. conductive inks or substrate materials) and/or processes (e.g. certain forming process such as thermoforming process with certain process parameters) may be readily available for use.

In some embodiments, the design input based on default settings or dynamically obtained input may be incomplete, e.g. generic or missing some data, such as material of circuit traces or substrate, required for duly modeling (mapping and/or optimizing) or actually manufacturing the 3D target design with the circuit design thereon. In response, the arrangement may be configured to fill in missing, deficient, or sub-optimum data with automatically determined selections or recommendations regarding the same based on e.g. simulation of several options and/or information available in the data repository on compatibilities between materials and forming or printing processes, or shapes/structures/features obtainable therewith, for example. The cultivated data may be then output in a number of digital files and/or via UI, for instance.

Mapping 514 and optimization 516 modules may be thus be both configured to utilize the data hosted by the design objectives element 518 as well as by the general repository 512.

Yet, the operation of the modules 514, 516 may be controlled by general control logic (typically defined in software 503 stored in memory 504 and run by processor 502) triggering the necessary mapping and optimization operations further in accordance with e.g. control input received.

Figure 6:
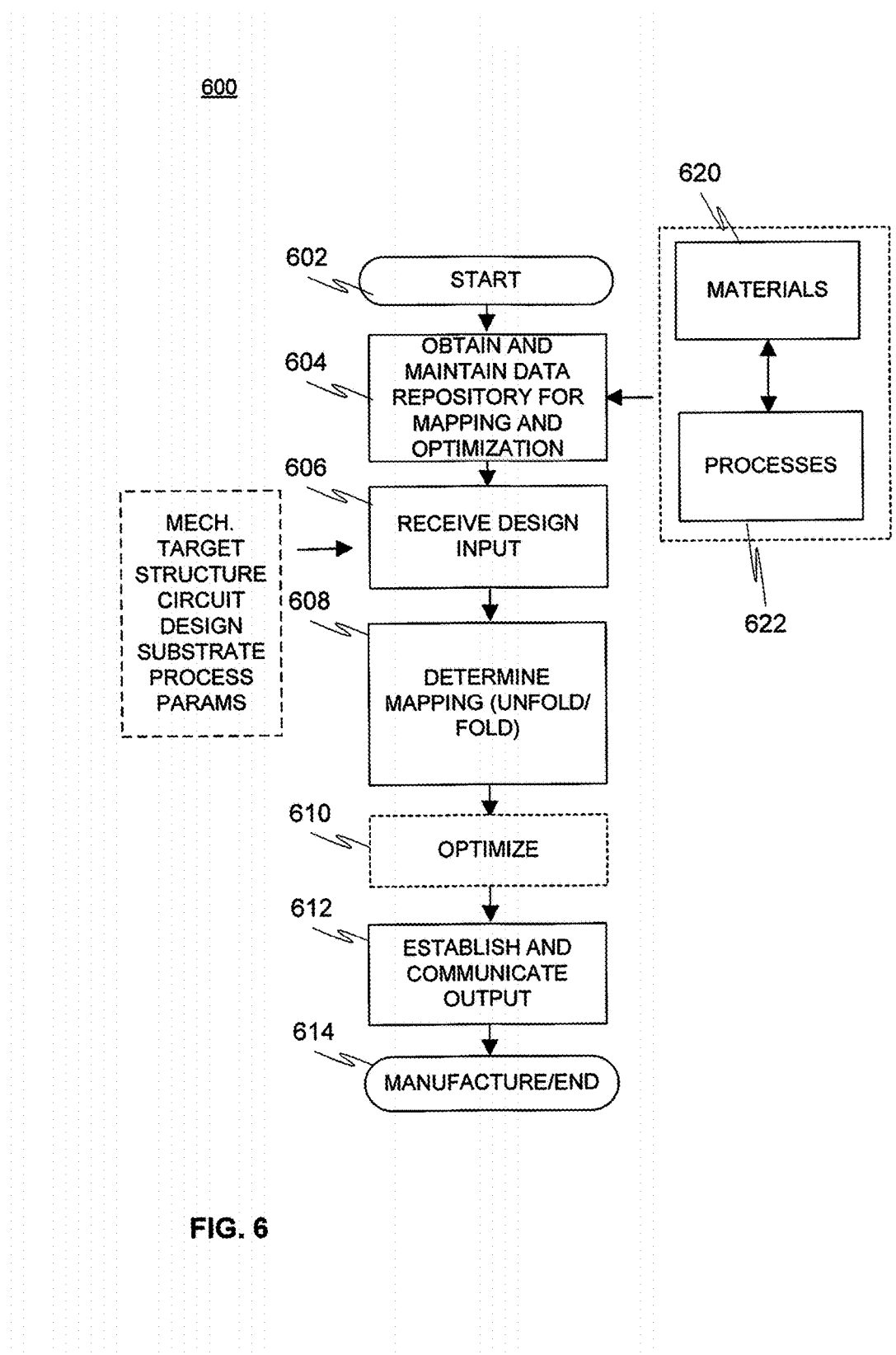
FIG. 6 is a flow diagram disclosing an embodiment of a method in accordance with the present invention.

FIG. 6 shows, at 600, a flow diagram disclosing an embodiment of a method in accordance with the present invention.

At the beginning of the method, a start-up phase 602 may be executed. During start-up 602, the necessary tasks such as acquisition of necessary hardware and software, i.e. arrangement e.g. in the form of one or more servers, for executing the method may be performed. Preferred communication facilities may be established and tested.

At 604, information is obtained and stored in a data repository as described hereinbefore, characterizing materials 620 and/or processes 622 applicable in producing circuits of electrically conductive structures on electrically insulating substrates subjected to 3D forming.

The data stored in the repository and/or obtained as design input may include mapping technique(s) enabling and specifying data for duly executing the associated simulations and/or projections, for instance. For example, the mapping technique may incorporate parameters whose values depend on the material and/or process characteristics indicated by related data.

At 606, design input is received preferably characterizing e.g.
- mechanical 3D target design to be produced from the substrate optionally through 3D forming,
- substrate (the input may indicate the substrate e.g. via its name, type and/or more specific material characteristics and e.g. dimensions related data, based on which further related data could be optionally fetched from the data repository for mapping purposes, for instance),
- 3D forming process, and preferably but not necessarily (if e.g. the interest is mainly in the unfolding/folding behaviour of the substrate alone, still taking deformation due to elongation into account) also
- target circuit design, defined in 2D and/or 3D domain, to be provided on the substrate.

As described above, the design input may further characterize additional features such as thermally functional features or graphics/other optical features such as light-guides to be provided on the substrate. Aspects regarding manufacturing or mounting of circuit layout may be indicated. Various optimization criteria may be received.

In some embodiments, part of the design input may be determined by means of settings that are preferably user-adjustable so that every time when the method is applied, features that remain static between the runs do not have to be separately input, but can be fetched from the settings instead (thus representing more static design input).

Alternatively or additionally, in some embodiments as deliberated hereinearlier one or more elements, characterizing e.g. used forming process and/or substrate, that could in some other embodiments form a part of the design input separately provided for each instance of use of the method or perhaps fetched from the settings, could be embedded or 'hard coded' in the mapping itself, e.g. mapping model or equation related parameter values.

At 608, a mapping, e.g. in the form of unfolding/folding function, between locations of the 3D target design and the substrate preceding processing such as 3D forming into the target design, including location of the circuit design, is determined through utilization of a selected mapping technique applying the received design input and information corresponding to the received design input e.g. in the data repository, wherein the mapping technique is further configured to estimate elongation of the substrate responsive to said 3D forming and take it into account in the mapping. As deliberated hereinearlier, mapping may at least partially rely upon simulation(s) or (cartographic/map) projection(s), for example.

Preferably, the mapping indicates and translates one or more features between the 3D target design and the substrate preferably at least in terms of location and/or dimensions thereof, preferably also further characteristics such as e.g. electrical conductance or resistance, and/or other properties of interest. The features may have been defined in the design input with indication of their target location on the substrate or 3D target design. The features may thus include features to be provided on the substrate or 3D target design processed from the substrate, optionally via 3D forming, based on the mapping. The features may comprise at least one element selected from the group consisting of: target circuit design, conductive trace, contact pad, electrode, electronic component, graphical element, thermally conductive or insulating element (e.g. cooling or shielding element), optical feature, wire-frame model, via, opening, and electrically insulating feature.

Yet, the features may comprise model data, optionally wire-frame model data, to facilitate visual inspection and analysis of the correspondence of the locations between the substrate and the 3D target design and/or e.g. extent of local elongation of the substrate. Such features ("design aids") may thus not have to be and typically are not physically present in the actual physical substrate or 3D target design to be produced therefrom through exploitation of the digital output indicative of the mapping and provided by the arrangement of the present invention.

In some embodiments, the arrangement may be configured to apply a pre-distortion to a graphical element, such as a logo or picture, indicated in the design input based on the mapping. The pre-distortion will take elongation of the substrate material due to forming and indicated by the mapping into account so that the graphical element, when printed on the substrate (in accordance with digital output of the arrangement indicating the pre-distorted graphics) to a location implied by the design input will appear pre-distorted. However, responsive to processing of the substrate into 3D target design through application of 3D forming, for example, the graphical element will gain its intended shape (undistorted) in the target design.

Similar optimization process may be applied to other printable features such as circuit traces (wiring). They may also have a decorative or aesthetic purpose in addition to e.g. electrical goal.

At 610, a number of further optional optimization tasks may be executed, which may result in repeated execution of mapping as well if e.g. substrate or forming characteristics are adapted during the procedure. Additional information on the potential optimization tasks can be found hereinelsewhere.

At 612, digital output is provided, including e.g. a computer-readable file or signal, comprising human (e.g. data to be visualized numerically, textually or graphically) and/or machine readable instructions (e.g. control code) indicative of the mapping (e.g. location mapping and preferably also feature mapping), to a receiving entity, such as ECAD software or other design tool possibly hosted by the arrangement itself or an external device, or to manufacturing equipment, e.g. printing, electronics assembly and/or forming equipment.

Instructions indicative of the mapping may include data determining the mapping itself (e.g. location correspondence data between unformed and formed substrate (i.e. target design obtained by forming the substrate), related offset data, mapping-based or -derived and potentially further optimized configuration of features such as the circuit design in terms of e.g. layout on the unformed substrate, dimensions, location and/or material related selections or recommendations regarding features such as traces, insulator elements, electronic components, optical features, etc. The instructions may include instructions for directly controlling a receiving entity such as further design tool (e.g. software and/or hardware) or manufacturing device, with reference to e.g. ECAD file, print instruction file or image file. The instructions may include data for visualizing, e.g. graphically, the mapping and/or related aspects such as recommendations or options concerning the 3D target design, circuit layout, substrate or e.g. forming, to a human operator or generally viewer via a suitable UI such as a display. Based thereon, the operator may control a further design tool or e.g. manufacturing device.

At 614, method execution is ended. Optionally, a number of further design and/or actual manufacturing stages may take place here based on the digital output with reference to e.g. provision of the circuit design on the substrate (e.g. by printed electronics equipment and/or electronics assembly, e.g. 2D and/or 3D, equipment), forming the substrate (e.g. by thermoforming device) and optionally overmolding at least part of the circuit and substrate for protection or other reasons by thermoplastic material using e.g. injection molding apparatus, wherein the formed substrate may be provided as an insert in a mold so that said at least part of the circuit already carried by the substrate faces the injected plastic. Alternatively, extruding process/machine could be utilized. Also various embodiments of the arrangement of the present invention may be correspondingly provided with such equipment for printing, assembly, forming and/or molding, for example.

Figure 7A:
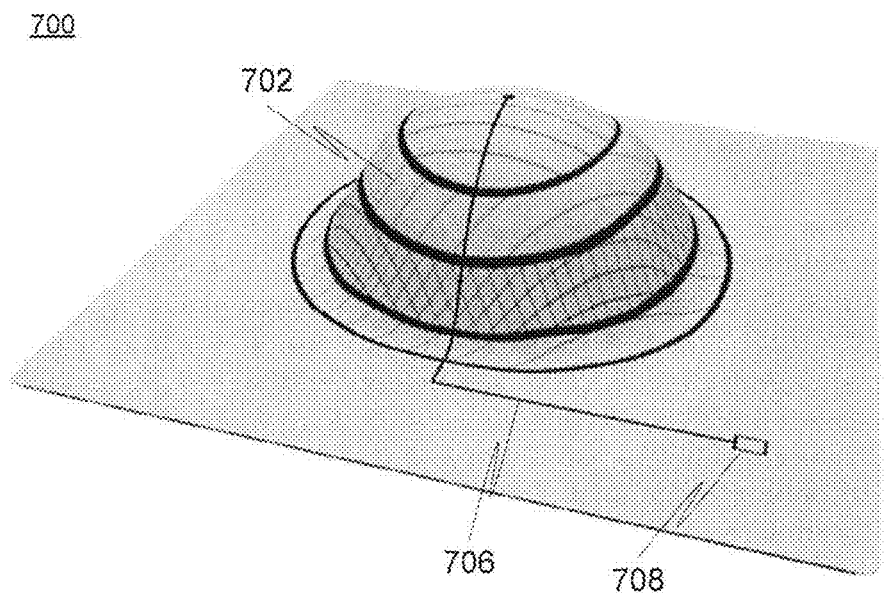
FIG. 7A illustrates one feasible example of 3D projection that could be produced and preferably also visualized by an embodiment of the present invention for inspecting and optimizing the circuit design such as layout (locations of conductive traces, electrically insulating elements and/or electronic components, for instance) and/or other features to be provided on the substrate, such as graphical elements, (other) optical elements, and/or thermally conductive or insulating elements.

FIG. 7A illustrates, at 700, one feasible example of a 3D (side) projection model of the 3D target design to be produced from the substrate through 3D forming, for example. Such projection, such as ortographic or axonometric projection, could be produced and preferably also visualized by an embodiment of the arrangement or method in accordance with the present invention, or data provided by it, for enabling inspecting and optimizing the circuit design such as layout (locations of conductive traces 706, electrically insulating elements and/or electronic components 708, for instance) and/or other features to be provided on the substrate such as graphical elements and/or thermally conductive or insulating elements.

As depicted in the figure, projected areas and generally features could be associated with elongation (stretch) density mapping or other feasible indication of the extent of local material elongation (distortion) due to forming. The indications could be visually, preferably graphically, shown 702 to the operator of the arrangement via the UI thereof to facilitate e.g. circuit layout design. The operator could then easily adjust the positions and/or routes of features such as traces so as to avoid undesired regions, e.g. the areas of excessive distortion.

Figure 7B:
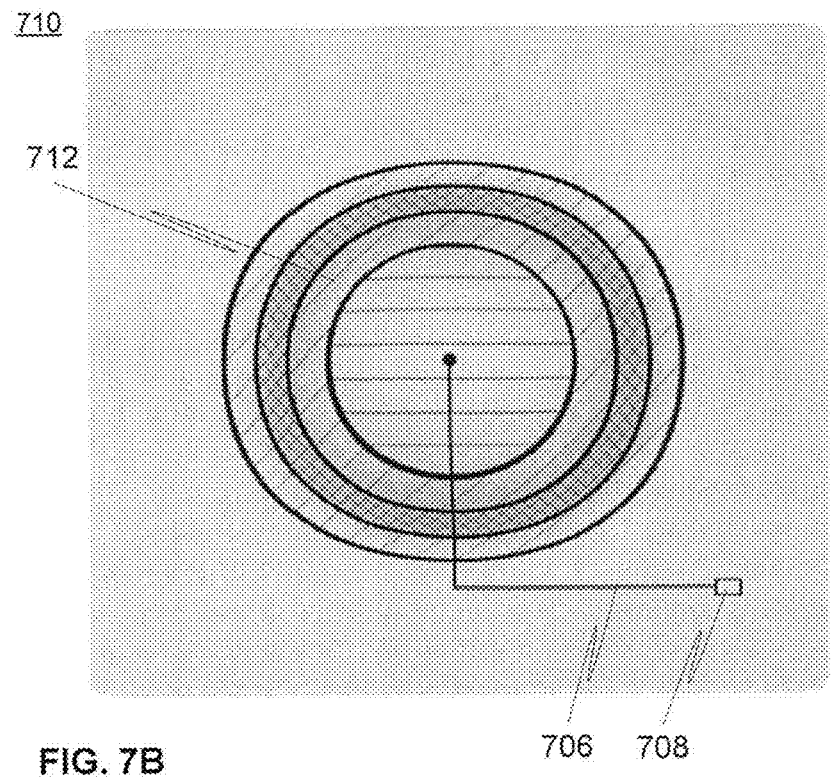
FIG. 7B illustrates a top/bottom view type direct Cartesian mapping (to z=0) that could be produced and advantageously also visualized by an embodiment of the present invention for use in design purposes such as layout optimization of circuit design.

FIG. 7B illustrates, at 710, direct Cartesian (to z=0) type top or bottom view for facilitating e.g. circuit 706, 708 design on the substrate with material elongation/distortion visualized via patterns/contour lines 712.

Figure 7C:
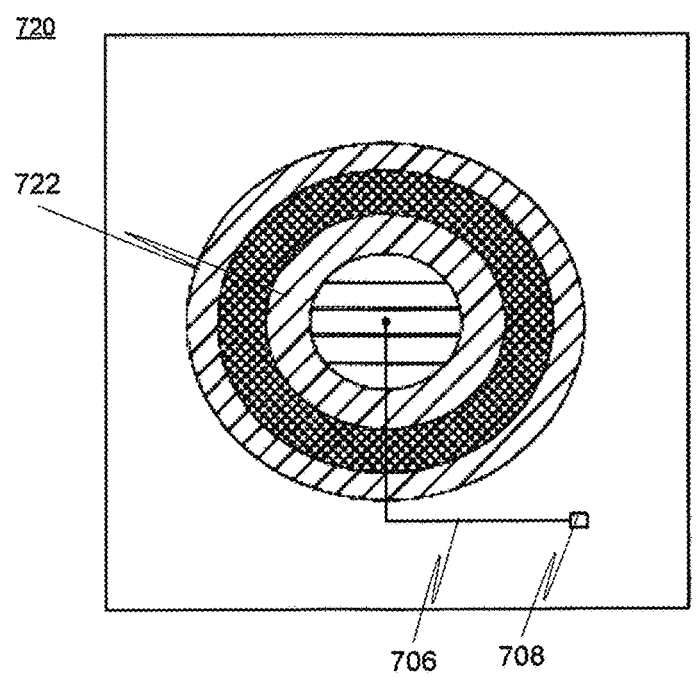
FIG. 7C illustrates an example of a preferred equidistant projection that could be produced and advantageously also visualized by an embodiment of the present invention for facilitating e.g. (2D) layout optimization of circuit design, such as conductive traces, from the standpoint of material elongation due to forming thereof upon establishing a mechanical 3D target design therefrom.

FIG. 7C roughly illustrates, at 720, one, merely exemplary, 1-point equidistant projection model that could be alternatively or additionally produced and preferably also visualized by an embodiment of the present invention for facilitating e.g. (2D) layout optimization of circuit design, such as conductive traces. Also the equidistance projection could be of top or bottom type as shown, for instance.

Again, information on local elongation (distortion) of substrate material and possible further material such as trace material positioned on the substrate prior to forming may be associated with the projection by suitable indicator(s) 722 such as elongation density or elongation density mapping, which may be graphically illustrated e.g. via the UI of the arrangement with suitable colors, patterns and/or contour lines.

Equidistant projection suits particularly well to detailed assessment and related optimal design (positioning, alignment, routing, etc.) of features, such as conductive traces or components, in the areas of considerable elongation. The equidistant projection may be configured to effectively illustrate elongation-based distortion of the material and related distances thereon from a reference such as the top of a formed shape (shown). One may notice here that the intermediate elongation or distortion indicator shapes or "rings" 722 of the equidistant projection 720 are wider and larger than the indicators 704 at 710 (direct Cartesian mapping or projection to z=0) as the indicators 722 model and imply the distance from the reference point in the center (top of the dome shape).

As mentioned hereinbefore, the arrangement of the present invention may, depending on the embodiment, support multiple different views and projections, whereupon the same design could be inspected and optimized using several different views/projections that may be shown alternately or simultaneously, e.g. next to each other.

The scope of the present invention is determined by the attached claims together with the equivalents thereof. A person skilled in the art will appreciate the fact that the disclosed embodiments were constructed for illustrative purposes only, and other arrangements applying many of the above principles could be readily prepared to best suit each potential use scenario.

The person will easily comprehend the fact that the above, merely exemplary, embodiments of the present invention may be flexibly and easily combined in terms of selected features to come up with further embodiments. Yet, further features may be introduced into the above or mixed embodiments.

In some scenarios, an embodiment of the present invention may be configured to take possible compression of the initial (substrate) material into account, i.e. in addition to or instead of elongation a process selected for use to produce the target design from the initial substrate may involve material compression of substrate and optionally further features such as traces thereon, which may be taken into account in the mapping (e.g. in used model/simulation), related material selections, process parameters, optimization tasks, etc. generally in a similar fashion as already contemplated hereinbefore having regard to elongation-inducing processing.

Yet, in some embodiments as already briefly mentioned hereinbefore, the target design to be produced from the substrate can be essentially two-dimensional, or at least a process to produce it from the substrate, may not have to include 3D forming. The process may cause the substrate to elongate in a plane (planar elongation), for example. In some embodiments, the elongation introduced to the substrate may be essentially of radial or axial type. Accordingly, the mapping technique shall still be configured to provide both reliable and realistic mapping also in these scenarios by duly selected simulation and/or modeling scheme(s), for example.

The invention claimed is:

1. An apparatus for facilitating circuit layout design in connection with three-dimensional (3D) target designs, the apparatus comprising:
   at least one communication interface;
   at least one processor; and
   a memory storing instructions which, when executed by the at least one processor, cause the apparatus to:
   obtain and store information in a data repository hosted by the memory, the information characterizing materials and/or processes applicable in producing circuits of electrically conductive structures on electrically insulating substrates subjected to processing,
   receive design input characterizing:
   a 3D target design to be produced from a substrate,
   a target circuit design, defined in a 2D and/or a 3D domain, to be provided on the substrate, the target circuit design including components and/or electrical traces in terms of intended properties, including one or more of material, conductivity/resistance, dimensions, manufacturing method, connections and/or location, of the target circuit design, and
   the substrate, including material and thickness or dimensions of the substrate,
   determine a mapping between locations of the 3D target design and the substrate, including a location of the target circuit design, through utilization of a selected mapping technique,
   apply the received design input and information corresponding to the received design input in the data repository, wherein the mapping technique is further configured to take elongation of the substrate during producing the 3D target design from the substrate, through 3D forming, into account in the mapping, and
   establish and provide digital output, as including at least one computer-readable file, comprising human and/or machine readable instructions indicative of the mapping, to manufacturing equipment, including at least one of a printing, electronics assembly and a forming equipment,
   wherein the computer-readable file is provided to the manufacturing equipment for manufacturing an electrical component.

2. The apparatus of claim 1, wherein at least one of:
   the mapping comprises mapping between locations of the 3D target design to be produced, utilizing 3D forming, from the substrate and the substrate in its original state prior to the 3D forming; and
   the mapping indicates and translates one or more features between the 3D target design and the substrate in terms of at least one of a location and/or dimensions of the one or more features, and a number of electrical properties including conductance or resistance.

3. The apparatus of claim 2, wherein the one or more features indicated and translated include at least one feature to be provided on the substrate or 3D target design to be processed from the substrate via 3D forming.

4. The apparatus of claim 3, wherein the one or more features comprise at least one element selected from the group consisting of: target circuit design, conductive trace, contact pad, electrode, electronic component, graphical element, optical feature, via, opening, thermally conductive feature, thermally insulating feature, and electrically insulating feature.

5. The apparatus of claim 2, wherein the one or more features comprise model data to facilitate visual inspection and analysis of the correspondence of the locations between the substrate and the 3D target design and/or extent of local elongation of the substrate.

6. The apparatus of claim 1, wherein the memory stores further instructions which, when executed by the at least one processor, cause the apparatus to indicate a mapped feature, including at least one or a conductive trace, graphical element, or electronic component, utilizing a model of the mapped feature.

7. The apparatus of claim 1, wherein at least one of:
   the mapping technique incorporates finite element analysis based simulation; and
   the mapping technique incorporates 3D map projection.

8. The apparatus of claim 7, wherein the memory stores further instructions which, when executed by the at least one processor, cause the apparatus to determine the projection based on at least one projection technique selected from the group consisting of: equidistant projection, 1-point equidistant projection, 2-point equidistant projection, and equidistant from a selected curve-projection.

9. The apparatus of claim 7, wherein the memory stores further instructions which, when executed by the at least one processor, cause the apparatus to apply a selected map projection locally or globally to map the 3D target design and the substrate.

10. The apparatus of claim 1, wherein the memory stores further instructions which, when executed by the at least one processor, cause the apparatus to determine substrate behaviour, via offset vector mapping, indicative of a related amount and direction of elongation, elongation percentage, elongation density or elongation factor, at a number of different locations of the substrate based on the design input characterizing at least the 3D target design.

11. The apparatus of claim 1, wherein the mapping is essentially surjective from the 3D target design to the substrate.

12. The apparatus of claim 1, further comprising a user interface for information transfer or interaction between the apparatus and a user, the user interface being configured to obtain at least part of the design input, obtain the information to be stored in the data repository, and/or provide the output therethrough.

13. The apparatus of claim 1, wherein the memory stores further instructions which, when executed by the at least one processor, cause the apparatus to receive at least part of the design input and/or information to be stored in the repository via the communication interface.

14. The apparatus of claim 1, wherein the memory stores further instructions which, when executed by the at least one processor, cause the apparatus to retrieve part of the design input, including characteristics of the substrate and/or a process to produce the 3D target design from the substrate, from, user-adjustable and/or -selectable, default settings stored in the memory.

15. The apparatus of claim 1, wherein characteristics regarding a process to produce the 3D target design from the substrate are at least partly embedded in the mapping technique.

16. The apparatus of claim 1, wherein the data repository comprises information regarding at least one element selected from the group consisting of: substrate materials, printing materials, electrically insulating materials, electrically insulating printing materials, electrically insulating inks, conductive printing materials, conductive inks, conductive adhesives, non-conductive adhesives, stretching characteristics of substrate materials, stretching characteristics of conductive inks, conductive traces, conductive contact pads, electronic components and printable electronic components.

17. The apparatus of claim 1, wherein the design input comprises at least one element selected from the group consisting of: a digital 3D model of the 3D target design, a CAE including a CAD file comprising the digital 3D model of a mechanical target design, indication of circuit schematic, ECAD file describing a circuit schematic, indication of circuit layout, digital file describing circuit layout, Gerber file or description, Gerber file or description describing a circuit layout or schematic, PDF file, PDF file describing a circuit schematic or layout, IDF file describing a circuit layout, image file describing a circuit layout, indication of substrate material, indication of substrate thickness, indication of substrate dimensions, digital model characterizing the substrate, and indication of substrate properties.

18. The apparatus of claim 1, wherein the material, includes substrate material, conductive material, conductive trace material, component material, electrically insulating material, or adhesive material is characterized in the data repository, design input and/or digital output, in terms of at least one property utilized in determining the mapping and/or output, and selected from the group consisting of: electrical conductivity, volume resistivity, dielectric strength, current density of material including conductive ink, resistivity change per unit change in elongation (dR/ds), breaking point when subjected to elongation, thermal conductivity, tensile strength, ultimate or breaking tensile strength, ductility, plasticity, stiffness, impact strength, mold shrinkage, coefficient of thermal expansion, chemical resistance, heat deflection, hardness, and flammability.

19. The apparatus of claim 1, wherein at least one of:
the design input characterizes the 3D forming process, including a type of forming process, temperature, velocity and/or pressure associated therewith; and
the design input characterizes one or more optical features, light control, informative and/or decorative features including graphics or masks, further covered by the mapping.

20. The apparatus of claim 1, wherein the memory stores further instructions which, when executed by the at least one processor, cause the apparatus to determine a selection, substitution, alternative or recommendation, to be indicated in the output, based on the design input and information in the data repository, concerning at least one element regarding the target circuit design, 3D target design and/or the substrate selected from the group consisting of: substrate material, substrate dimensions, substrate shape, process parameter, forming method, forming parameter, forming temperature, forming pressure, forming time, conductive material, conductive ink, conductive adhesive, non-conductive adhesive, resin, location of one or more features including elements of the target circuit design, location of one or more features including elements of the target circuit design on the substrate prior to forming, circuit layout of the target circuit design on the substrate prior to and/or subsequent to forming, component location, component location on the substrate prior to forming, via or feedthrough location, via or feedthrough dimensions, via or feedthrough material, conductive trace or pad width, conductive trace or pad thickness, conductive trace or pad location, conductive trace or pad shape, conductive trace route, conductive trace bend, conductive trace bend radius, conductive trace or pad length, conductive trace material, topological feature of the 3D target design, shape and/or size of a topological feature of the 3D target design, level of curvature or bend radius of a topological feature of the 3D target design, and configuration including material, shape, dimensions and/or location of an optical feature at the substrate for controlling visible and/or non-visible light including a lightguide, reflector, optical mask, absorber or diffuser.

21. The apparatus of claim 1, wherein the memory stores further instructions which, when executed by the at least one processor, cause the apparatus to determine the material, material characteristic, thickness, length, or width of conductive element, including a trace or pad of conductive ink, or of electrically insulating material to be provided on the substrate based on a bend radius implied by the 3D target design.

22. The apparatus of claim 1, wherein the output comprises at least one element selected from the group consisting of: a CAE file, indication of circuit schematic, indication of circuit layout, ECAD file describing a circuit layout, IDF file describing a circuit layout, a print instruction file for printing at least part of the target circuit design, including a number of electrical traces, on the substrate, image file describing a circuit layout, file containing instructions for 3D assembly of a number of electronic components, indication of substrate material, indication of substrate thickness, indication of substrate dimensions, and indication of substrate properties.

23. The apparatus of claim 1, wherein the memory stores further instructions which, when executed by the at least one processor, cause the apparatus to provide, in the output, a collection of suggested alternative options regarding the circuit layout of the target circuit design, forming process, 3D target design and/or substrate, in the order of superiority according to a selected criterion.

24. The apparatus of claim 1, wherein at least one of:
the design input comprises a number of user-defined design requirements that the apparatus is configured to essentially follow in determining the mapping or output;
the design input comprises a number of user-defined design preferences that the apparatus is configured to selectively replace with design options determined more suitable according to selected criteria;
the design input characterizes design requirements or preferences concerning an electrically conductive or insulating feature to be provided on the substrate, thermally conductive or insulating feature to be provided on the substrate, including a conductive trace of the target circuit design or the target circuit design in general, in terms of minimizing or maximizing the associated surface area on the substrate, minimizing or maximizing electrical resistance, conductance and/or material elongation following processing including 3D forming of the substrate to produce the 3D target design from the substrate, and/or using or avoiding one or more selected materials in the construction, whereupon the memory stores further instructions which, when executed by the at least one processor, cause the apparatus to utilize the requirements or preferences in determining the layout of the feature or related target circuit design based on the mapping, and indicate the result in the output;
the design input characterizes at least part of a circuit schematic, of a related layout, of the target circuit design in 2D and the memory stores further instructions which, when executed by the at least one processor, cause the apparatus to optimize the layout, including positioning and/or materials, of one or more associated circuit features or specifically elements, including conductive traces, pads and/or components, on the substrate based on the mapping and selected criteria, including physical stretch and/or electrical resistance minimization, and indicate the result in the output; and the design input characterizes at least part of the target circuit design, including of related layout, in 3D and the memory stores further instructions which, when executed by the at least one processor, cause the apparatus to determine the positioning of at least part of the target circuit design on the substrate based on the mapping.

25. The apparatus of claim 1, wherein the memory stores further instructions which, when executed by the at least one processor, cause the apparatus to at least one of:

provide an indication in the digital output and/or via a user interface, of a related estimated amount of stretch, stretch percentage, stretch density, or stretch factor, at one or more locations of the substrate;

indicate, graphically, the mapping via a point to point or region to region indicator, by terms of a common element between the models of the substrate and 3D target design processed from the substrate;

determine an estimate of a selected point to point and/or feature-specific property, including an electrical property of the circuit in a state following the forming of the substrate, during forming, and/or prior to forming, wherein the memory stores further instructions which, when executed by the at least one processor, cause the apparatus to indicate the property in the digital output, and/or via a user interface, and/or utilize it in optimizing the configuration of the target circuit design; and dynamically or iteratively receive design input indicative of a desired change in the previously provided input, supplementary input, or a desired change in the output, wherein the memory stores further instructions which, when executed by the at least one processor, cause the apparatus to re-determine the mapping and/or the output based thereon.

26. The apparatus of claim 1, wherein the memory stores further instructions which, when executed by the at least one processor, cause the apparatus to at least one of:

identify, based on one or more identification or identifiable cues detected in the target circuit design of the design input, including in a digital file or user control input, a plurality of stacked conductive layers upon a common surface of the substrate separated by electrically insulating layers in between, and wherein the memory stores further instructions which, when executed by the at least one processor, cause the apparatus to optimize the layout of each stacked conductive layer and adjacent insulating layer based on the mapping so that no short circuit will result unless detected also in the original target circuit design of the design input;

determine at least one electrical characteristic of the target circuit design when produced on the substrate and subjected to elongation due to 3D forming of the hosting substrate, and take the characteristic and its behaviour due to elongation into account in optimizing at least one property, including the location, route, material, cross-sectional area, thickness and/or width, of the features based on the mapping and information stored in the repository;

optimize at least one property, including the location, route, material, amount or concentration of conductive features, cross-sectional area, thickness and/or width, of one or more features, including traces, of the target circuit design, wherein the optimization objective includes at least one element selected from the group consisting of: resistance minimization, material use minimization, and/or material cost minimization;

estimate a conductivity or resistivity change of a conductive feature, including a trace, of the target circuit design based on mutual repositioning of conductive material within the feature due to the elongation, and wherein the memory stores further instructions which, when executed by the at least one processor, cause the apparatus to utilize the estimate in the optimization of the target circuit design; and provide at least part of the output utilizing display data to be signalled to the user via a display or a projector.

27. The apparatus of claim 1, wherein the target circuit design comprises at least one element selected from the group consisting of: electrically conductive trace, contact pad, electrically insulating element, electrode, electronic component, electromechanical component, electro-optical or optoelectronic component, thermally conductive material or element, radiation-emitting component, light-emitting component, LED (light-emitting diode), OLED (organic LED), side-shooting LED or other light source, top-shooting LED or other light source, bottom-shooting LED or other light source, radiation detecting component, light-detecting component, photodiode, phototransistor, photovoltaic device, sensor, micromechanical component, switch, touch switch, proximity switch, touch sensor, proximity sensor, capacitive switch, capacitive sensor, projected capacitive sensor or switch, single-electrode capacitive switch or sensor, multi-electrode capacitive switch or sensor, self-capacitance sensor, mutual capacitive sensor, inductive sensor, sensor electrode, user interface element, user input element, vibration element, communication element, data processing element, integrated circuit, microcontroller, microprocessor, signal processor, data storage element, and electronic subassembly.

* * * * *